(12) United States Patent
Hanaoka et al.

(10) Patent No.: US 7,965,303 B2
(45) Date of Patent: Jun. 21, 2011

(54) IMAGE DISPLAYING APPARATUS AND METHOD, AND IMAGE PROCESSING APPARATUS AND METHOD

(75) Inventors: Toshiharu Hanaoka, Chiba (JP); Yasuhiro Yoshida, Chiba (JP); Masafumi Ueno, Urayasu (JP); Hiroyuki Furukawa, Sakura (JP); Kenichiroh Yamamoto, Chiba (JP); Takashi Yoshii, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 970 days.

(21) Appl. No.: 11/817,141

(22) PCT Filed: Feb. 21, 2007

(86) PCT No.: PCT/JP2007/053162
§ 371 (c)(1),
(2), (4) Date: Aug. 24, 2007

(87) PCT Pub. No.: WO2007/105433
PCT Pub. Date: Sep. 20, 2007

(65) Prior Publication Data
US 2009/0231314 A1    Sep. 17, 2009

(30) Foreign Application Priority Data

Feb. 28, 2006  (JP) .................................. 2006-053416
Dec. 27, 2006  (JP) .................................. 2006-351784

(51) Int. Cl.
G09G 5/00    (2006.01)
G09G 5/02    (2006.01)
H04N 7/14    (2006.01)
H04N 11/04   (2006.01)
G06K 9/40    (2006.01)
G06K 9/32    (2006.01)

(52) U.S. Cl. ........ 345/606; 345/581; 345/616; 345/643; 348/14.14; 348/14.15; 348/407; 348/416; 375/240.16; 375/240.01; 382/254; 382/300; 358/525

(58) Field of Classification Search .................. 345/581, 345/428, 600, 606, 611, 616–619, 586, 639, 345/643, 673; 348/14.14, 14.15, 402, 407, 348/415–416, 430–431, 447, 466; 375/240.01, 375/240.16; 382/252–254, 276, 300; 358/525
See application file for complete search history.

(56) References Cited

U.S. PATENT DOCUMENTS
5,144,427 A  *  9/1992 Kitaura et al. ........... 375/240.16
(Continued)

FOREIGN PATENT DOCUMENTS
JP          6-178285 A      6/1994
(Continued)

OTHER PUBLICATIONS

Yuji Nojiri et al., Journal of the Institute of Television Engineers of Japan, vol. 48, No. 1, pp. 84-94, (1994).

Primary Examiner — Wesner Sajous
(74) Attorney, Agent, or Firm — Birch, Stewart, Kolasch & Birch, LLP

(57) ABSTRACT

In an image displaying apparatus including a motion compensated rate converting (FRC) portion, deterioration of image quality is prevented in an image having a high-speed region and a low-speed region mixed. The FRC portion includes a motion vector detecting portion 11e and an interpolation frame generating portion 12b. The motion vector detecting portion 11e includes a first region detecting means $112e_1$ that detects a first region (high-speed region) including a motion amount equal to or greater than a first predetermined amount from an input image signal, a second region detecting means $112e_2$ that detects a second region (low-speed region) including a motion amount equal to or less than a second predetermined amount from the input image signal, and a third region detecting means 113e that detects a still region from an inter-frame difference of the input image signal. The interpolation frame generating portion 12b executes a motion compensated interpolation process using motion vectors for the still region in the first region (background) and executes a zero-vector interpolation process for the still region in the second region (foreground).

35 Claims, 24 Drawing Sheets

U.S. PATENT DOCUMENTS

| | | | | |
|---|---|---|---|---|
| 5,883,673 | A * | 3/1999 | Miyamoto | 375/240.12 |
| 6,005,639 | A * | 12/1999 | Thomas et al. | 348/699 |
| 6,014,173 | A * | 1/2000 | Miyamoto | 375/240.16 |
| 6,327,391 | B1 * | 12/2001 | Ohnishi et al. | 382/236 |
| 2007/0053712 | A1 * | 3/2007 | Fujiwara et al. | 399/88 |

FOREIGN PATENT DOCUMENTS

| | | |
|---|---|---|
| JP | 6-217263 A | 8/1994 |
| JP | 8-149421 A | 6/1996 |
| JP | 3295437 A | 6/2002 |
| JP | 2005-51460 A | 2/2005 |

* cited by examiner

FIG. 25
(A)
(B)
(C)
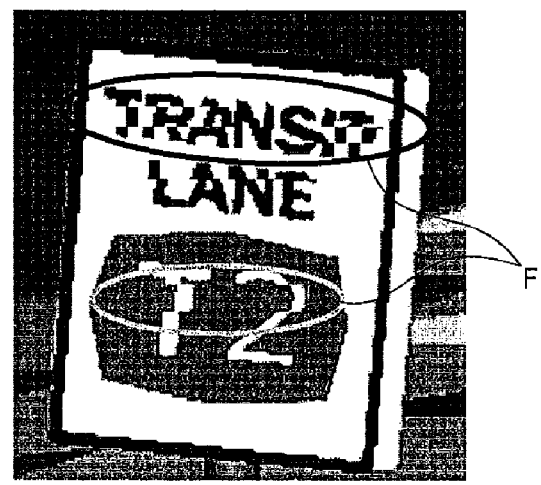

FIG. 26
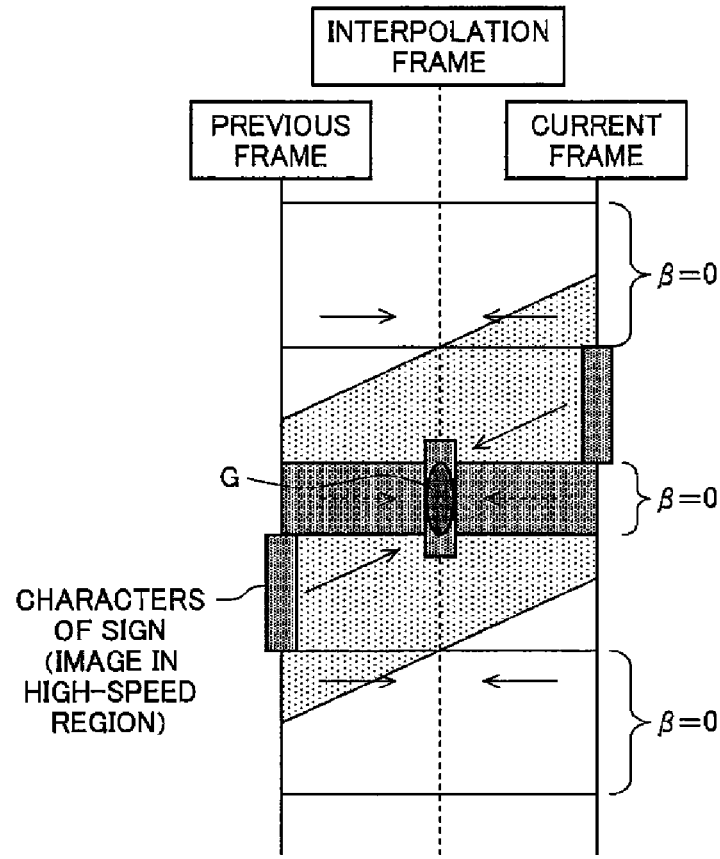
(A)
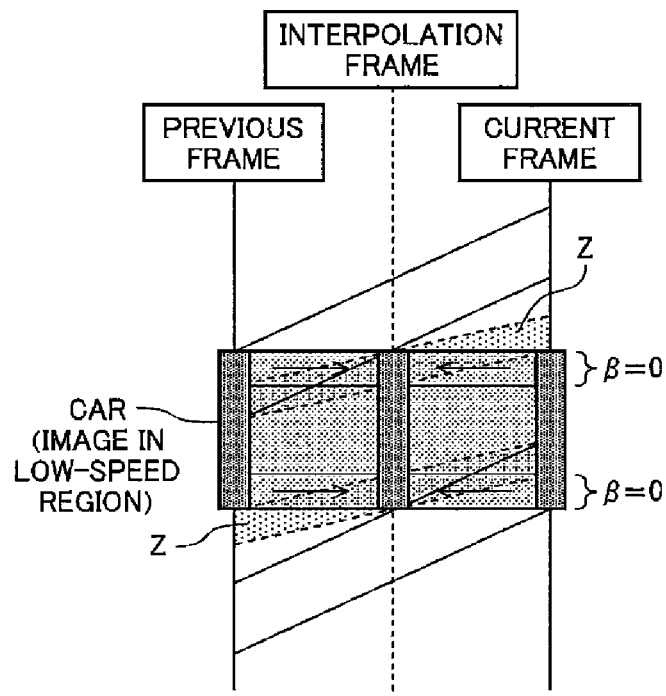
(B)

FIG. 27
(A)
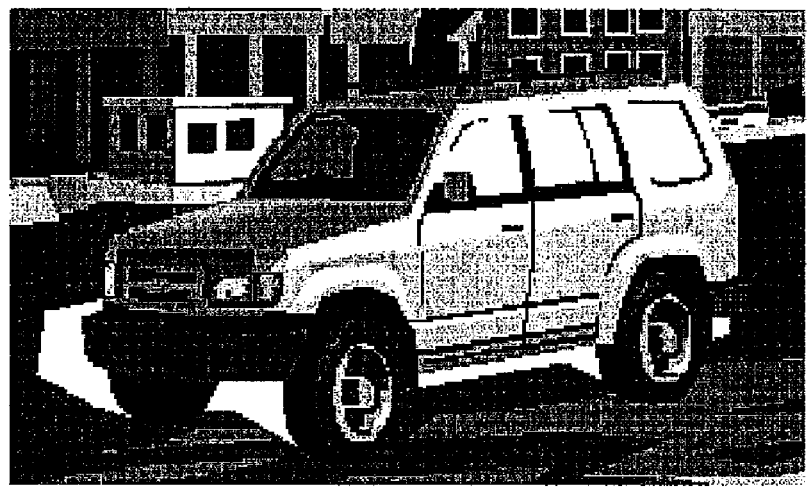
(B)
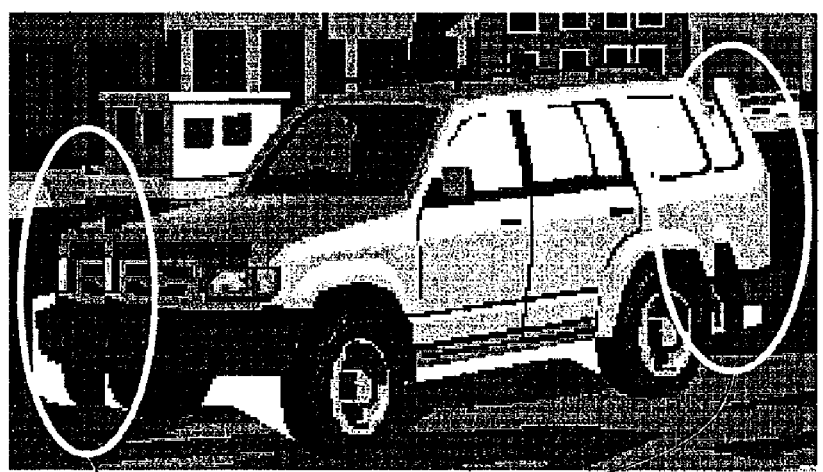
H

IMAGE DISPLAYING APPARATUS AND METHOD, AND IMAGE PROCESSING APPARATUS AND METHOD

TECHNICAL FIELD

The present invention relates to an image displaying apparatus and method and an image processing apparatus and method that include a function of converting a frame rate or field rate and, more particularly, to an image displaying apparatus and an image displaying method of the apparatus and an image processing apparatus and an image processing method of the apparatus that can execute different interpolation processes for a plurality of regions having different vector amounts, such as foreground and background of an image, when executing a motion compensated rate conversion process.

BACKGROUND OF THE INVENTION

As compared to conventional cathode-ray tubes (CRTs) primarily used for realizing moving images, LCDs (Liquid Crystal Displays) have a drawback, so-called motion blur, which is, blurring of outline of a motion portion perceived by a viewer when displaying an image with motion. It is suggested that this motion blur arises from the LCD display mode itself (see, e.g., patent document 1).

Since fluorescent material is scanned by an electron beam to cause emission of light for display in CRTs, the light emission of each pixel is basically impulse-like although slight afterglow of the fluorescent material exists. This is called an impulse display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is disposed for each dot configuring a pixel and each pixel normally has an auxiliary capacity, the ability to retain the accumulated charge is extremely high. Therefore, the light emission is continued until the pixels are rewritten by the application of the electric field based on image information of the next frame or field (hereinafter, represented by the frame). This is called a hold display mode.

Since impulse response of image displaying light has a temporal spread in the above hold display mode, temporal frequency characteristics are deteriorated along with spatial frequency characteristics, resulting in the motion blur. That is, since the human eyes can smoothly follow a moving object, if the light emission time is long as in the case of the hold type, motion of image seems jerky and unnatural due to a time integration effect.

To improve the motion blur in the above hold display mode, a frame rate (number of frames) is converted by interpolating an image between frames in a known technology. This technology is called FRC (Frame Rate Converter) and is put to practical use in liquid crystal displaying apparatuses, etc.

Conventionally known methods of converting the frame rate include various techniques such as simply repeating readout of the same frame for a plurality of times and frame interpolation using linear interpolation between frames. However, in the case of the frame interpolation using linear interpolation between frames, unnaturalness of motion (jerkiness, judder) is generated due to the frame rate conversion, and the motion blur disturbance due to the above hold display mode cannot sufficiently be improved, resulting in inadequate image quality.

To eliminate effects of the jerkiness, etc., and improve quality of moving images, a motion compensated frame interpolation (motion compensation) process using motion vectors has been proposed. In this motion compensation process, since a moving image itself is captured and compensated, highly natural moving images can be acquired without deteriorating the resolution and generating the jerkiness. Since interpolation image signals are generated with motion compensation, the motion blur disturbance due to the above hold display mode can sufficiently be improved.

Above patent document 1 discloses a technology of motion-adaptively generating interpolation frames to increase a frame frequency of a display image for improving deterioration of spatial frequency characteristics causing the motion blur. In this case, at least one interpolation image signal interpolated between frames of a display image is motion-adaptively created from the previous and subsequent frames, and the created interpolation image signals are interpolated between the frames and are sequentially displayed.

By increasing the display frame frequency with the motion compensated frame interpolation process using the motion vector information, the display state of LCDs (hold display mode) can be made closer to the display state of CRTs (impulse display mode), and an improvement can be made in the image quality deterioration due to the motion blur generated when displaying moving images.

In the motion compensated frame interpolation process, it is essential to detect the motion vectors for the motion compensation. For example, the block matching method, gradient method, etc., are proposed as representative techniques for the motion vector detection. In the gradient method, the motion vector is detected for each pixel or small block between two consecutive frames and this is used to interpolate each pixel or small block of the interpolation frame between two frames. That is, an image at an arbitrary position between two frames is interpolated at an accurately compensated position to convert the number of frames.

Conventionally, an interpolation processing method giving priority to zero-vector is known that the interpolation process is performed with the use of zero-vector instead of the detected vector if no difference exists between the previous frame and the current frame, that is, for a still region, (see, e.g., patent document 2, non-patent document 1). This process is effective for improving the image quality of background images. For example, according to an invention described in patent document 2, since the background is in a substantially still state as compared to the foreground when a camera remains stationary, the zero-vector preferential interpolation process is executed for the background region, and the zero-vector preferential interpolation process is not executed for the foreground region.

FIG. 24 is a block diagram of a main configuration of an interpolation frame generating process of a conventional frame rate converting portion, and in FIG. 24, 101 is a delaying portion; 102 is a still region detecting portion; 103 is an interpolation vector evaluating portion; 104 is an interpolation vector controlling portion; and 105 is an interpolation frame generating portion. An input image signal is delayed for one frame period by the delaying portion 101, and each image signal of a previous frame and a current frame is input to the interpolation vector evaluating portion 103, the still region detecting portion 102, and the interpolation frame generating portion 105.

A motion vector detecting portion not shown selects a motion vector closest to the motion vector of the detected block for an initial vector from a vector memory (not shown) having accumulated thereon motion vectors already detected in a frame right before the previous frame as initial vector candidates (estimation vectors), and the selected initial vector is used as a starting point to detect a motion vector between the previous frame and the current frame with gradient method calculations.

The interpolation vector evaluating portion 103 evaluates the motion vector detected by the motion vector detecting portion and executes a process of allocating an optimum interpolation vector to an interpolation block of an interpolation frame based on the evaluation result. That is, the interpolation vector evaluating portion 103 uses the estimation vectors sequentially input from the vector memory to calculate DFD (Displaced Field Difference) and determines and outputs the optimum interpolation vector based on this DFD.

DFD is an index indicating an accuracy degree of a motion vector (the estimation vector in this case) and is an absolute value sum of inter-frame differences between each pixel in the detected block and each pixel in a block pointed by the motion vector from the detected block. Therefore, the smaller a DFD value is, the better the matching becomes between the detected block and the block pointed by the motion vector from the detected block, which indicates that the corresponding candidate vector is more appropriate.

In a technology proposed in above non-patent document 1, a flag β is set to perform motion detection of an input image, in other words, to determine a still region. The still region means a region with a slow motion or no motion.

The still region detecting portion 102 sets the above flag β, calculates FD (Field Difference), which is DFD for zero-vector, and compares the FD with a predetermined threshold to detect the still region. In this case, the DFD is calculated using the interpolation vector output from the interpolation vector evaluating portion 103, and the minimum value Min (DFD) of the DFD is used as the predetermined threshold to output β=1 when Min(DFD)<FD and otherwise output β=0. That is, the still region detecting portion 102 outputs β=1 for the moving region and β=0 for the still region to the interpolation vector controlling portion 104 based on the inter-frame differences of the input image signals.

The above determination condition of the still region is not limited to the condition of Min(DFD)<FD, and even if the condition of Min(DFD)<FD is not satisfied, β=1 (i.e., detection of the moving region) may be output when the absolute value of Min(DFD) is sufficiently small. Alternatively, for example, such a condition as Min(DFD)×k<FD(0≦k≦1) is set to rigidify the detection criterion of the still region.

The interpolation vector controlling portion 104 outputs a control signal to the interpolation frame generating portion 105 such that the interpolation vector from the interpolation vector evaluating portion 103 is directly used to generate an interpolation frame if β=1 is input from the still region detecting portion 102 and such that zero-vector is used instead of the interpolation vector from the interpolation vector evaluating portion 103 to generate the interpolation frame if β=0 is input from the still region detecting portion 102.

Based on two input frames and the control signal from the interpolation vector controlling portion 104, the interpolation frame generating portion 105 generates and outputs an interpolation frame to the subsequent stage based on the interpolation vector from the interpolation vector evaluating portion 103 or zero-vector.

In the case of a video shot while panning a camera at a high speed in a certain direction to follow a subject, for example, in the case of a video shot by following a moving car with a camera as shown by an image example of FIG. 25(A), objects other than a shooting target, i.e., the car, such as buildings and trees in the background portion and a sign passing through the foreside move in the direction opposite to the motion direction of the car at a very high speed in the video. If motion vectors are analyzed in such a video scene, the region of the car becomes an almost still state, and large motion vectors are detected in the direction opposite to the motion direction of the car for the buildings and trees in the background portion and the sign passing through the foreside. That is, when such a video is captured by a computing machine, the region of the car is determined as a low-speed region and the region other than the car is determined as a high-speed region.

In the case of the above video, with regard to the sign passing in front of the car at a high speed, as shown in FIGS. 25(B) and 25(C), a portion of a character may be collapsed to cause color of a portion other than the character to appear inside of the character or cause color of the character to appear on a portion other than the character (portions shown by F of FIG. 25(C)). This collapse is caused by the above zero-vector preferential interpolation process and is likely to occur if the zero-vector interpolation is performed in accordance with the still region determination when an image such as characters having sharp edges at some portions exists within an image having a uniform color like the sign, for example.

FIG. 26 is a diagram for explaining a principle of the collapse generated by executing the zero-vector preferential interpolation process for the still region within the high-speed region. In FIG. 26(A), the zero-vector preferential interpolation process is performed for a region where the FD is diminished, i.e., a portion of β=0, which is defined as a still region in accordance with so-called still region determination. If a peripheral image of the still region moves (scrolls) at a high speed, this causes the collapse since a motion amount of object during one frame period becomes large. In FIG. 26(A), if the interpolation process is executed with zero-vector (arrow shown by a dot line), the background of the character, i.e., an image of the sign itself is interpolated into a region where the character of the sign should normally exist, which is indicated by G within the interpolation frame, and as a result, a portion of the character is lacked.

On the other hand, in the portion of the car, which has a motion vector closer to zero, better image quality can be acquired by executing the zero-vector preferential interpolation process. Describing the reason why better image quality can be acquired by giving priority to zero-vector in the interpolation for the still region within the low-speed region corresponding to the car referring to FIG. 26(B), as shown in a band portion Z, since a composite vector is generated at both ends of the low-speed region from the motion vectors of the high-speed region image (such as buildings, trees, and sign) and the motion vectors of the low-speed region, an interpolation image may be somewhat pulled to the motion direction of the background (high-speed region) image. Therefore, a preferable result is acquired from inside of both ends of the low-speed region by using β=0, i.e., the zero-vector preferential interpolation process, and the zero-vector preferential interpolation process is more appropriate for the still region portion within the low-speed region.

However, even if the zero-vector preferential interpolation process is simply executed for the still region within the low-speed region and the zero-vector preferential interpolation is not executed for the still region within the high-speed region, the collapse may occur in the interpolation image outside of the low-speed region as shown in FIG. 27. For example, if the above interpolation process is applied to an image shown in FIG. 27(A), the collapse may occur in a portion H surrounded by ellipsoids, i.e., both ends of the car corresponding to the ends of the low-speed region as shown in FIG. 27(B). In FIG. 27(B), an image of the low-speed region, i.e., a portion of the car is depicted in a position where the images of the high-speed region (such as buildings and trees) corresponding to the background should normally be depicted.

FIG. 28 is a diagram for explaining a principle of the collapse occurring at outer circumferential ends of the low-speed region. In FIG. 28, if an interpolation process is executed with the use of the motion vector (arrow shown by a dot line), it is problematic that the collapse such as those formed by pulling the low-speed region image occurs due to the effect of the low-speed region image in a region shown by I of the interpolation frame where the high-speed region image should normally exist.

Patent Document 1: Specification of Japanese Patent No. 3295437

Patent Document 2: Japanese Laid-Open Patent Publication No. H6-178285

Non-Patent Document 1: Y. Nojiri, H. Hirabayashi, H. Sonehara, and F. Okano, "HDTV Standards Converter", Journal of the Institute of Television Engineers of Japan, Vol. 48, No. 1, pp. 84-94 (1994)

DISCLOSURE OF THE INVENTION

Problems to be Solved by the Invention

As described above, technologies proposed in above patent document 2 and non-patent document 1 are arranged such that if a still region is detected in an image, β=0 is output to execute the zero-vector preferential interpolation process for the still region.

However, in the case of an image having a high-speed region and a low speed region mixed, for example, in the case of an image shot while panning a camera to follow a subject, since large motion exists in the high-speed region as compared to the low-speed region that is the subject, it is problematic that the collapse shown in FIG. 25(C) occurs if the zero-vector preferential interpolation process is executed for the still region in the high-speed region shown in FIG. 25(B), for example.

On the other hand, since the low-speed region is an image with smaller motion and closer to zero-vector, the image quality is more effectively improved by executing the zero-vector preferential interpolation process for the still region in the low-speed region. Therefore, in the case of the image having the high-speed region and the low-speed region mixed, the image quality cannot sufficiently be improved simply by not executing the zero-vector preferential interpolation process.

If the zero-vector preferential interpolation process is executed for the still region in the low-speed region and if the zero-vector preferential interpolation process is not executed for the still region in the high-speed region, the image quality cannot sufficiently be improved since the collapse shown in FIG. 27(B) occurs at outer circumferential ends of the low-speed region.

The present invention was conceived in view of the above situations and it is therefore the objects of the present invention to enable different interpolation processes to be executed for a plurality of regions having different motion amounts, such as a low-speed region and a high-speed region of an image and to alleviate a collapse generated at the ends of the low-speed region due to motion of a high-speed region image when an interpolation process other than motion compensation process is executed for a still region in the low-speed region and a motion compensated interpolation process is executed in accordance with motion vectors for the still region in the high-speed region.

Means for Solving the Problems

In order to solve the above problems, a first technical means of the present invention is an image displaying apparatus having a rate converting portion that interpolates an image signal subjected to a motion compensation process between frames or fields of an input image signal to convert and output the number of frames or fields of the input image signal to a displaying panel, comprising: a first region detecting portion that detects a first region including a pixel having a motion amount equal to or greater than a first predetermined amount between the frames or fields of the input image signal; a second region detecting portion that detects a second region different from the first region, the second region including a pixel having a motion amount equal to or less than a second predetermined amount between the frames or fields of the input image signal; and a third region detecting portion that detects a still region from an inter-frame or inter-field difference of the input image signal, wherein the rate converting portion executes a first interpolation frame generating process using motion vectors for the still region in the first region and executes a second interpolation frame generating process different from the first interpolation frame generating process for the still region in the second region.

A second technical means is the image displaying apparatus as defined in the first technical means, wherein the second interpolation frame generating process is a process of disabling the motion compensation process in the rate converting portion.

A third technical means is the image displaying apparatus as defined in the first or second technical means, wherein the rate converting portion includes a motion vector detecting portion that detects motion vector information between consecutive frames or fields included in the input image signal, an interpolation vector allocating portion that allocates an interpolation vector between the frames or the fields based on the detected motion vector information, an interpolation image generating portion that generates an interpolation image signal from the allocated interpolation vector, and an image interpolating portion that interpolates the generated interpolation image signal between the frames or the fields.

A fourth technical means is the image displaying apparatus as defined in the third technical means, wherein the second interpolation frame generating process is a process of setting an interpolation vector of an interpolation block corresponding to the still region in the second region to zero-vector to disable the motion compensation process for each pixel of the interpolation block.

A fifth technical means is the image displaying apparatus as defined in the fourth technical means, wherein the interpolation block has flag information added and wherein the interpolation vector of the interpolation block having the flag information added is set to zero-vector.

A sixth technical means is the image displaying apparatus as defined in any one of the first to third technical means, wherein the second interpolation frame generating process is a process of generating an image signal not subjected to the motion compensation process between the frames or fields of the input image signal.

A seventh technical means is the image displaying apparatus as defined in the sixth technical means, wherein the second interpolation frame generating process is a process of generating an image signal acquired by subjecting the image signal of the frames or fields to a linear interpolation process between the frames or fields of the input image signal.

An eighth technical means is the image displaying apparatus as defined in the sixth technical means, wherein the second interpolation frame generating process is a process of generating an image signal identical to the image signal of the frames or fields between the frames or fields of the input image signal.

A ninth technical means is the image displaying apparatus as defined in the first technical means, wherein the second interpolation frame generating process is a process of varying compensation intensity of the motion compensation process in the rate converting portion.

A tenth technical means is the image displaying apparatus as defined in the ninth technical means, wherein the second interpolation frame generating process is a process of performing weighted addition of an image signal subjected to the motion compensation process and an image signal subjected to the linear interpolation process at a predetermined rate to generate an interpolation image signal.

An eleventh technical means is the image displaying apparatus as defined in the tenth technical means, wherein the image signal subjected to the linear interpolation process is used as the interpolation image signal for the still region in the second region and wherein the image signal subjected to the motion compensation process is used as the interpolation image signal for the still region in the first region.

A twelfth technical means is the image displaying apparatus as defined in any one of the first to eleventh technical means, wherein the motion compensation process in the rate converting portion is sequentially varied in intensity in a boundary between the region subjected to the second interpolation frame generating process and other regions.

A thirteenth technical means is the image displaying apparatus as defined in any one of the first to twelfth technical means, comprising: a telop region detecting portion that detects a telop region included in the input image signal, the telop region being detected as the first region.

A fourteenth technical means is the image displaying apparatus as defined in any one of the first to thirteenth technical means, comprising: an image synthesis processing portion that combines a second image signal different from the input image signal with the input image signal, the region combined with the second image signal being detected as the second region.

A fifteenth technical means is the image displaying apparatus as defined in the fourteenth technical means, wherein the second image signal is an on-screen display signal generated within the image displaying apparatus.

A sixteenth technical means is the image displaying apparatus as defined in the fourteenth technical means, wherein the second image signal is a data information display signal acquired by receiving data broadcast.

A seventeenth technical means is the image displaying apparatus as defined in any one of the first to sixteenth technical means, comprising: a portion that expands at least one end of the still region in the second region in a motion direction or an opposite direction thereof by a predetermined amount.

An eighteenth technical means is the image displaying apparatus as defined in the seventeenth technical means, comprising: a full-screen motion amount calculating portion that calculates a motion amount of the entire screen of the displaying panel, wherein the amount of expanding the still region in the second region is determined based on the motion amount of the entire screen.

A nineteenth technical means is the image displaying apparatus as defined in the seventeenth technical means, comprising: a full-screen motion amount calculating portion that calculates a motion amount of a peripheral region of the still region in the second region, wherein the amount of expanding the still region in the second region is determined based on the motion amount of the peripheral region.

A twentieth technical means is the image displaying apparatus as defined in any one of the first to seventeenth technical means, comprising: a full-screen motion amount calculating portion that calculates a motion amount of the entire screen of the displaying panel, wherein the first predetermined amount and/or the second predetermined amount are varied in accordance with the motion amount of the entire screen.

A twenty-first technical means is the image displaying apparatus as defined in any one of the eighteenth to twentieth technical means, wherein the full-screen motion amount calculating portion uses an average value of motion vectors in the entire screen of the displaying panel to calculate the motion amount of the entire screen.

A twenty-second technical means is the image displaying apparatus as defined in any one of the eighteenth to twentieth technical means, wherein the full-screen motion amount calculating portion uses predetermined related data added to the input image signal to calculate the motion amount of the entire screen.

A twenty-third technical means is the image displaying apparatus as defined in any one of the first to twenty-second technical means, wherein the first predetermined amount and the second predetermined amount are the same.

A twenty-fourth technical means is an image displaying apparatus having a rate converting portion that interpolates an image signal subjected to a motion compensation process between frames or fields of an input image signal to convert and output the number of frames or fields of the input image signal to a displaying panel, comprising: a low-speed region detecting portion that detects a low-speed region including a pixel having a motion amount equal to or less than a predetermined amount between the frames or fields of the input image signal; and a still region detecting portion that detects a still region from an inter-frame or inter-field difference of the input image signal, wherein the rate converting portion executes a first interpolation frame generating process using motion vectors for regions other than the still region in the low-speed region and executes a second interpolation frame generating process different from the first interpolation frame generating process for the still region in the low-speed region.

A twenty-fifth technical means is the image displaying apparatus as defined in the twenty-fourth technical means, wherein the second interpolation frame generating process is a process of disabling the motion compensation process in the rate converting portion.

A twenty-sixth technical means is the image displaying apparatus as defined in the twenty-fourth technical means, wherein the second interpolation frame generating process is a process of varying compensation intensity of the motion compensation process in the rate converting portion.

A twenty-seventh technical means is an image displaying method having a step of interpolating an image signal subjected to a motion compensation process between frames or fields of an input image signal to convert the number of frames or fields of the input image signal, the method comprising the steps of: detecting a first region including a pixel having a motion amount equal to or greater than a first predetermined amount between the frames or fields of the input image signal; detecting a second region different from the first region, the second region including a pixel having a motion amount equal to or less than a second predetermined amount between the frames or fields of the input image signal; detecting a still region from an inter-frame or inter-field difference of the input image signal; and executing a first interpolation frame generating process using motion vectors for the still region in the first region and executing a second interpolation frame generating process different from the first interpolation frame generating process for the still region in the second region.

A twenty-eighth technical means is an image displaying method having a step of interpolating an image signal subjected to a motion compensation process between frames or fields of an input image signal to convert the number of frames or fields of the input image signal, the method comprising the steps of: detecting a first region including a pixel having a motion amount equal to or greater than a first predetermined amount between the frames or fields of the input image signal; detecting a second region different from the first region, the second region including a pixel having a motion amount equal to or less than a second predetermined amount between the frames or fields of the input image signal; detecting a still region from an inter-frame or inter-field difference of the input image signal; expanding at least one end of the still region in the second region in a motion direction or an opposite direction thereof by a predetermined amount; and executing a first interpolation frame generating process using motion vectors for the still region in the first region and executing a second interpolation frame generating process different from the first interpolation frame generating process for the still region in the second region expanded by the predetermined amount.

A twenty-ninth technical means is an image displaying method having a step of interpolating an image signal subjected to a motion compensation process between frames or fields of an input image signal to convert the number of frames or fields of the input image signal, the method comprising the steps of: detecting a low-speed region including a pixel having a motion amount equal to or less than a predetermined amount between the frames or fields of the input image signal; detecting a still region from an inter-frame or inter-field difference of the input image signal; executing a first interpolation frame generating process using motion vectors for regions other than the still region in the low-speed region and executing a second interpolation frame generating process different from the first interpolation frame generating process for the still region in the low-speed region.

A thirtieth technical means is an image processing apparatus having a rate converting portion that interpolates an image signal subjected to a motion compensation process between frames or fields of an input image signal to convert the number of frames or fields of the input image signal, comprising: a first region detecting portion that detects a first region including a pixel having a motion amount equal to or greater than a first predetermined amount between the frames or fields of the input image signal; a second region detecting portion that detects a second region different from the first region, the second region including a pixel having a motion amount equal to or less than a second predetermined amount between the frames or fields of the input image signal; and a third region detecting portion that detects a still region from an inter-frame or inter-field difference of the input image signal, wherein the rate converting portion executes a first interpolation frame generating process using motion vectors for the still region in the first region and executes a second interpolation frame generating process different from the first interpolation frame generating process for the still region in the second region.

A thirty-first technical means is the image processing apparatus as defined in the thirtieth technical means, comprising: a portion that expands at least one end of the still region in the second region in a motion direction or an opposite direction thereof by a predetermined amount.

A thirty-second technical means is an image processing apparatus having a rate converting portion that interpolates an image signal subjected to a motion compensation process between frames or fields of an input image signal to convert the number of frames or fields of the input image signal, comprising: a low-speed region detecting portion that detects a low-speed region including a pixel having a motion amount equal to or less than a predetermined amount between the frames or fields of the input image signal; and a still region detecting portion that detects a still region from an inter-frame or inter-field difference of the input image signal, wherein the rate converting portion executes a first interpolation frame generating process using motion vectors for regions other than the still region in the low-speed region and executes a second interpolation frame generating process different from the first interpolation frame generating process for the still region in the low-speed region.

A thirty-third technical means is an image processing method having a step of interpolating an image signal subjected to a motion compensation process between frames or fields of an input image signal to convert the number of frames or fields of the input image signal, the method comprising the steps of: detecting a first region including a pixel having a motion amount equal to or greater than a first predetermined amount between the frames or fields of the input image signal; detecting a second region different from the first region, the second region including a pixel having a motion amount equal to or less than a second predetermined amount between the frames or fields of the input image signal; detecting a still region from an inter-frame or inter-field difference of the input image signal; and executing a first interpolation frame generating process using motion vectors for the still region in the first region and executing a second interpolation frame generating process different from the first interpolation frame generating process for the still region in the second region.

A thirty-fourth technical means is an image processing method having a step of interpolating an image signal subjected to a motion compensation process between frames or fields of an input image signal to convert the number of frames or fields of the input image signal, the method comprising the steps of: detecting a first region including a pixel having a motion amount equal to or greater than a first predetermined amount between the frames or fields of the input image signal; detecting a second region different from the first region, the second region including a pixel having a motion amount equal to or less than a second predetermined amount between the frames or fields of the input image signal; detecting a still region from an inter-frame or inter-field difference of the input image signal; expanding at least one end of the still region in the second region in a motion direction or an opposite direction thereof by a predetermined amount; and executing a first interpolation frame generating process using motion vectors for the still region in the first region and executing a second interpolation frame generating process different from the first interpolation frame generating process for the still region in the second region expanded by the predetermined amount.

A thirty-fifth technical means is an image processing method having a step of interpolating an image signal subjected to a motion compensation process between frames or fields of an input image signal to convert the number of frames or fields of the input image signal, the method comprising the steps of: detecting a low-speed region including a pixel having a motion amount equal to or less than a predetermined amount between the frames or fields of the input image signal; detecting a still region from an inter-frame or inter-field difference of the input image signal; and executing a first interpolation frame generating process using motion vectors for regions other than the still region in the low-speed region and executing a second interpolation frame generating process different from the first interpolation frame generating process for the still region in the low-speed region.

EFFECT OF THE INVENTION

According to the present invention, different interpolation processes are executed for a plurality of regions having different motion amounts, such as a low-speed region and a high-speed region of an image, to prevent a collapse of an interpolation image from occurring due to a zero-vector preferential interpolation process.

If an interpolation process other than a motion compensation process is executed for a still region in the low-speed region and a motion compensated interpolation process is executed in accordance with motion vectors for a still region in the high-speed region, the low-speed region is expanded by a predetermined amount to alleviate a collapse occurring at the ends of the low-speed region due to motion of the high-speed region image.

BRIEF DESCRIPTION OF THE DRAWINGS

FIG. 25 is a diagram of an example of a collapse caused by executing a zero-vector interpolation process for a high-speed region.

FIG. 26 is a diagram for explaining a principle of the collapse caused by executing the zero-vector interpolation process for the high-speed region.

FIG. 27 is a diagram of an example of a collapse generated at the ends of the low-speed region when the zero-vector interpolation process is executed for the low-speed region and the zero-vector interpolation process is not executed for the high-speed region.

EXPLANATIONS OF REFERENCE NUMERALS

Figure 1:
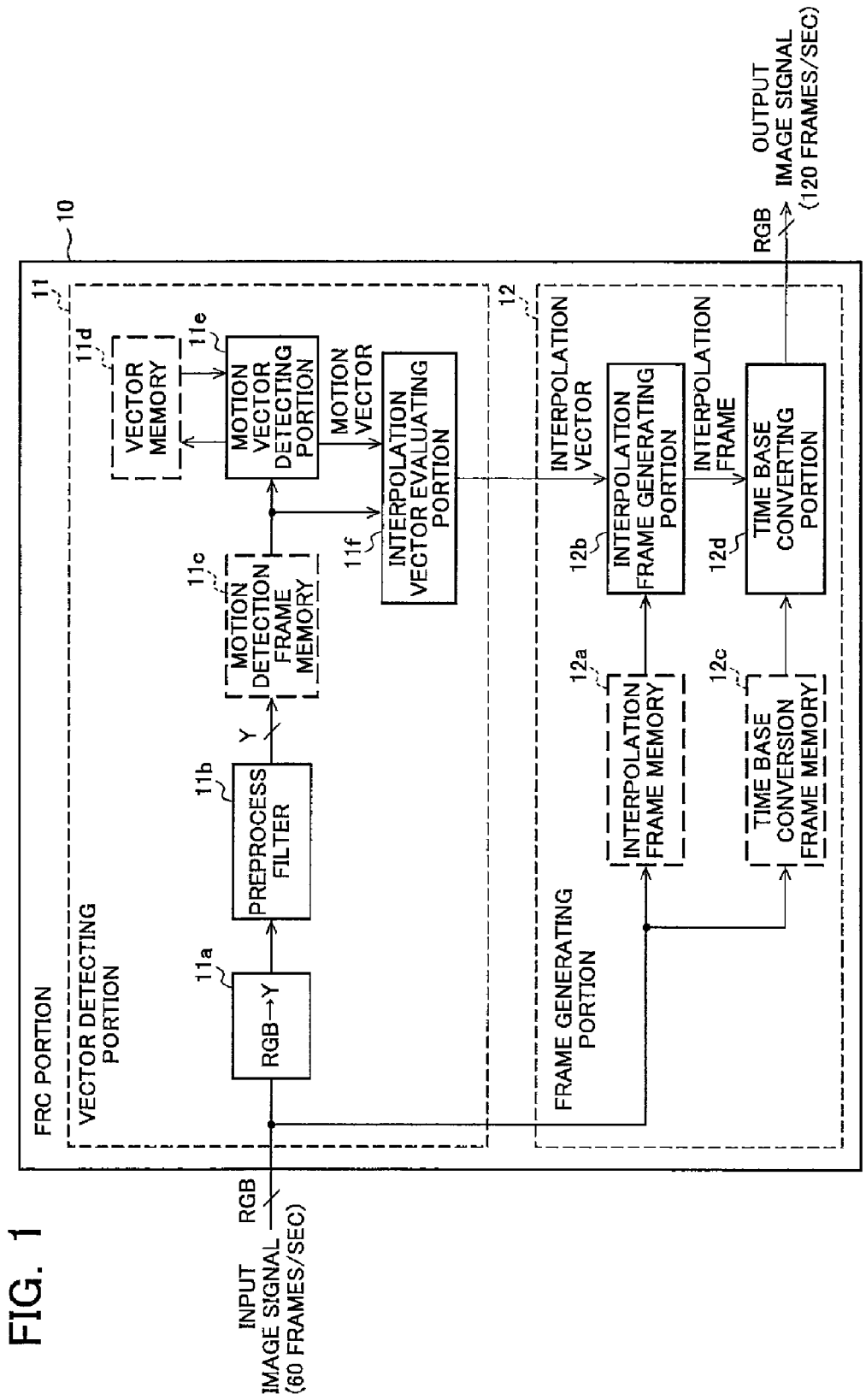
FIG. 1 is a block diagram of a configuration example of a motion compensated frame rate converting portion included in an image displaying apparatus of the present invention.

10 . . . frame rate converting (FRC) portion; 11 . . . vector detecting portion; 11a . . . luminance signal extracting means; 11b . . . preprocess filter; 11c . . . motion detection frame memory;

11d . . . vector memory; 11e . . . motion vector detecting portion;

111e,101 . . . delaying portion; 112e . . . low-speed region detecting portion; 112$e_1$ . . . first region detecting means; 112$e_2$ . . . second region detecting means; 113e, 102 . . . still-region detecting portion (third region detecting means); 114e, 104 . . . interpolation vector compensating portion; 115e . . . region expanding portion; 116e . . . full-screen average motion vector calculating portion; 117e . . . peripheral average motion vector calculating portion; 11f, 103 . . . interpolation vector evaluating portion; 12 . . . frame generating portion; 12*a* ... interpolation frame memory; 12*b*, 105 ... interpolation frame generating portion; 121*b* ... first interpolation frame generation processing portion; 122*b* ... second interpolation frame generation processing portion; 12*c* ... time base conversion frame memory; 12*d* ... time base converting portion, 12*e* ... interpolation vector memory; 12*f* ... compensation intensity varying portion; 13 ... controlling portion; 14 ... electrode driving portion; 15 ... liquid crystal displaying panel; 16 ... switching portion; 17 ... path; 18 ... linear interpolation processing portion; 19 ... memory; 20 ... decoding portion; 21 ... image synthesis processing portion; 22 ... synthesizing portion; and 23 ... telop region detecting portion.

PREFERRED EMBODIMENTS OF THE INVENTION

Preferred embodiments of an image displaying apparatus of the present invention will hereinafter be described with reference to the accompanying drawings. In the drawings, the portions having the same functions have the same reference numerals added and will not repeatedly be described.

Although the present invention is applicable to either field signals and interpolation field signals or frame signals and interpolation frame signals, the frame signals and interpolation frame signals will be described as a representative example since both (field and frame) signals are similar to each other.

FIG. 1 is a block diagram of a configuration example of a motion compensated frame rate converting portion included in the image displaying apparatus of the present invention; in FIG. 1, 10 is a frame rate converting portion (hereinafter, FRC portion); the FRC portion 10 is configured by a vector detecting portion 11 that detects a motion vector between two consecutive frames included in an input image signal and a frame generating portion 12 that generates an interpolation frame (interpolation image) based on the detected motion vector. Although the iterative gradient method is used for the motion vector detection in the description of the vector detecting portion 11, the method is not limited to the iterative gradient method and may be the block matching method.

Since a feature of the iterative gradient method is that a motion vector can be detected for each block, several types of motion amounts can be detected, and a motion vector can be detected even from a moving object having a small region. The circuit configuration thereof can be realized in a smaller scale than other modes (such as the block matching method). In the iterative gradient method, an already detected motion vector of a neighboring block is defined as an initial deflection vector, which is used as a starting point to repeat calculations of the gradient method for a detected block. With this method, a substantially accurate motion amount can be acquired by repeating the gradient method about two times.

In FIG. 1, the vector detecting portion 11 includes a luminance signal extracting portion 11*a* that extracts a luminance signal (Y signal) from an input image signal (RGB signal), a preprocess filter 11*b* that restrains a high bandwidth by applying LPF to the extracted Y signal, a motion detection frame memory 11*c*, a vector memory 11*d* that accumulates initial vector candidates as estimation vectors, a motion vector detecting portion 11*e* that detects motion vectors between frames with the use of the iterative gradient method, and an interpolation vector evaluating portion 11*f* that allocates an interpolation vector between the frames based on the detected motion vectors.

The FRC portion 10 corresponds to a rate converting means of the present invention; the motion vector detecting portion 11*e* corresponds to a motion vector detecting portion of the present invention; and the interpolation vector evaluating portion 11*f* corresponds to an interpolation vector allocating portion of the present invention.

When the iterative gradient method is applied, since a differential component of a pixel is used for calculations, the method is easily affected by noises and calculation errors are increased if large gradient variations exist in a detected block, and therefore, the LPF is applied by the preprocess filter 11*b* to constrain a higher bandwidth. In the vector memory 11*d*, motion vectors already detected in a frame immediately before the previous frame are accumulated as initial vector candidates (estimation vectors).

The motion vector detecting portion 11*e* selects a motion vector closest to the motion vector of the detected block for an initial vector from the estimation vectors accumulated in the vector memory 11*d*. That is, the initial vector is selected by the block matching method from the already detected motion vectors (estimation vectors) in neighboring blocks of the detected block. The motion vector detecting portion 11*e* uses the selected initial vector as a starting point to detect a motion vector between a previous frame and a current frame through calculations of the gradient method.

The interpolation vector evaluating portion 11*f* evaluates the motion vectors detected by the motion vector detecting portion 11*e*, allocates an optimum interpolation vector to an interpolation block between frames based on the evaluation result, and outputs the vector to the frame generating portion 12.

The frame generating portion 12 includes an interpolation frame memory 12*a* that accumulates two input frames (previous frame and current frame), an interpolation frame generating portion 12*b* that generates an interpolation frame based on the two input frames from the interpolation frame memory 12*a* and the interpolation vector from the interpolation vector evaluating portion 11*f*, a time base conversion frame memory 12*c* for accumulating the input frames (previous frame and current frame), and a time base converting portion 12*d* that inserts the interpolation frame from the interpolation frame generating portion 12*b* into the input frames from the time base conversion frame memory 12*c* to generate an output image signal (RGB signal).

The interpolation frame generating portion 12*b* corresponds to an interpolating image generating portion of the present invention and the time base converting portion 12*d* correspond to an image interpolating portion of the present invention.

Figure 2:
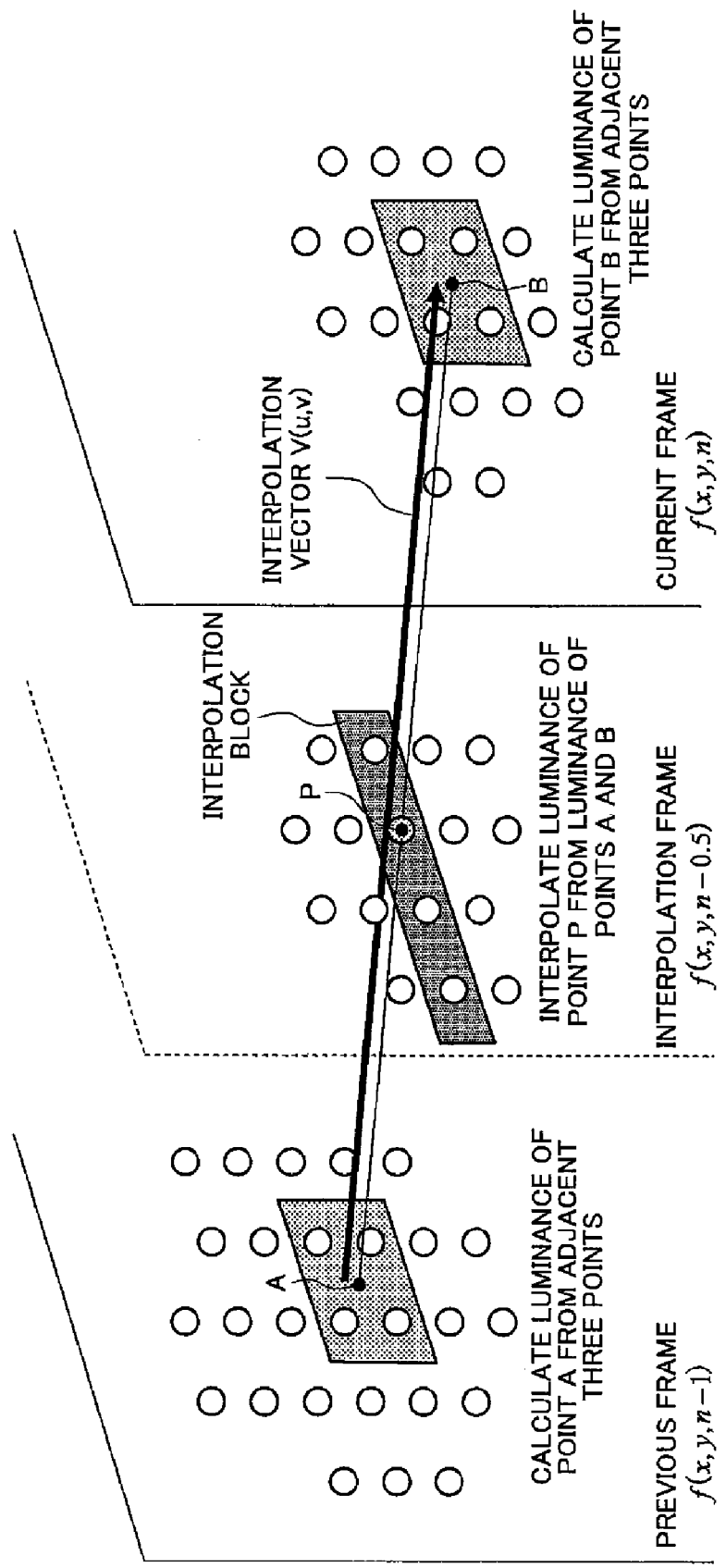
FIG. 2 is a diagram for explaining an example of an interpolation frame generating process of a frame generating portion.

FIG. 2 is a diagram for explaining an example of the interpolation frame generating process of the frame generating portion 12. The interpolation frame generating portion 12*b* stretches an interpolation vector V allocated to the interpolation block into the previous frame and the current frame and uses pixels located adjacent to the intersecting points with the frames to interpolate each pixel in the interpolation block. For example, in the previous frame, the luminance of a point A is calculated from three adjacent points. In the current frame, the luminance of a point B is calculated from three adjacent points. In the interpolation frame, the luminance of a point P is interpolated using the luminance of the points A and B. The luminance of the point P may be an average of the luminance of the point A and the luminance of the point B, for example.

The interpolation frame generated as above is sent to the time base converting portion 12*d*. The time base converting portion 12*d* sandwiches the interpolation frame between the previous frame and the current frame to perform a process of converting a frame rate. In this way, the FRC portion 10 can convert the input image signal (60 frames/sec) into a motion compensated output image signal (120 frames/sec), which can be output to a display panel to reduce occurrence of the motion blur disturbances and improve the moving image quality. Although the 60-frame/sec input image signal is converted into the 120-frame/sec (doubled) output image signal in the frame rate conversion of this description, this is obviously applicable to the case of acquiring 90-frame/sec (one and a half times) and 180-frame/sec (three times) output image signal, for example.

Figure 3:
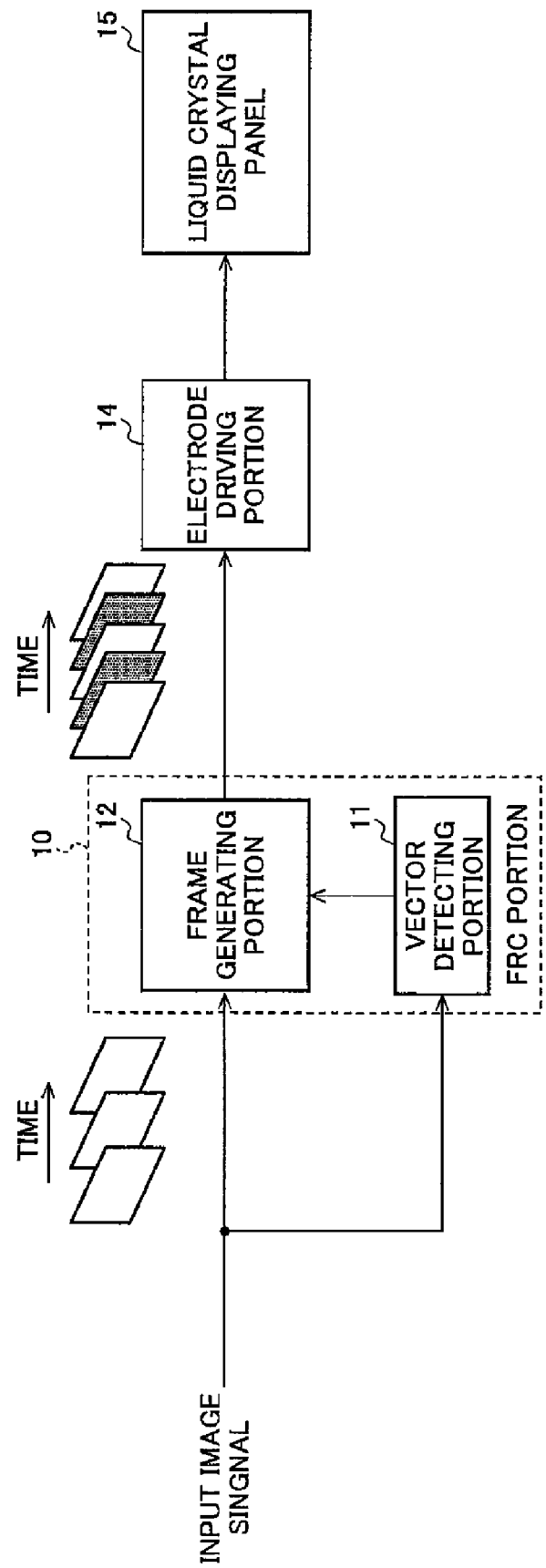
FIG. 3 is a block diagram of a configuration example of an image displaying apparatus including an FRC portion according to the present invention.

FIG. 3 is a block diagram of a configuration example of the image displaying apparatus including the FRC portion 10 according to the present invention, and the image displaying apparatus includes the FRC portion 10, an electrode driving portion 14, and a liquid crystal displaying panel 15. The liquid crystal displaying panel 15 is an active-matrix liquid crystal display that has a liquid crystal layer and electrodes for applying scan signals and data signals to the liquid crystal layer. The electrode driving portion 14 is a display driver for driving scan electrodes and data electrodes of the liquid crystal displaying panel 15 based on the image signal subjected to the frame rate conversion by the FRC portion 10.

The drive frequency of the liquid crystal displaying panel 15 is a frame frequency converted by the FRC portion 10. Therefore, for example, if an image signal input with a frame frequency of 60 Hz is converted by the FRC portion 10 into a frame frequency of 120 Hz, the drive frequency of the liquid crystal displaying panel 15 is 120 Hz. Although the present invention is applicable to general image displaying apparatuses having the hold-type display characteristics such as liquid crystal displays, organic EL displays, and electrophoretic displays, a representative example described in the following embodiments will be the case of applying the present invention to a liquid crystal displaying apparatus using a liquid crystal displaying panel for a display panel.

Figure 4:
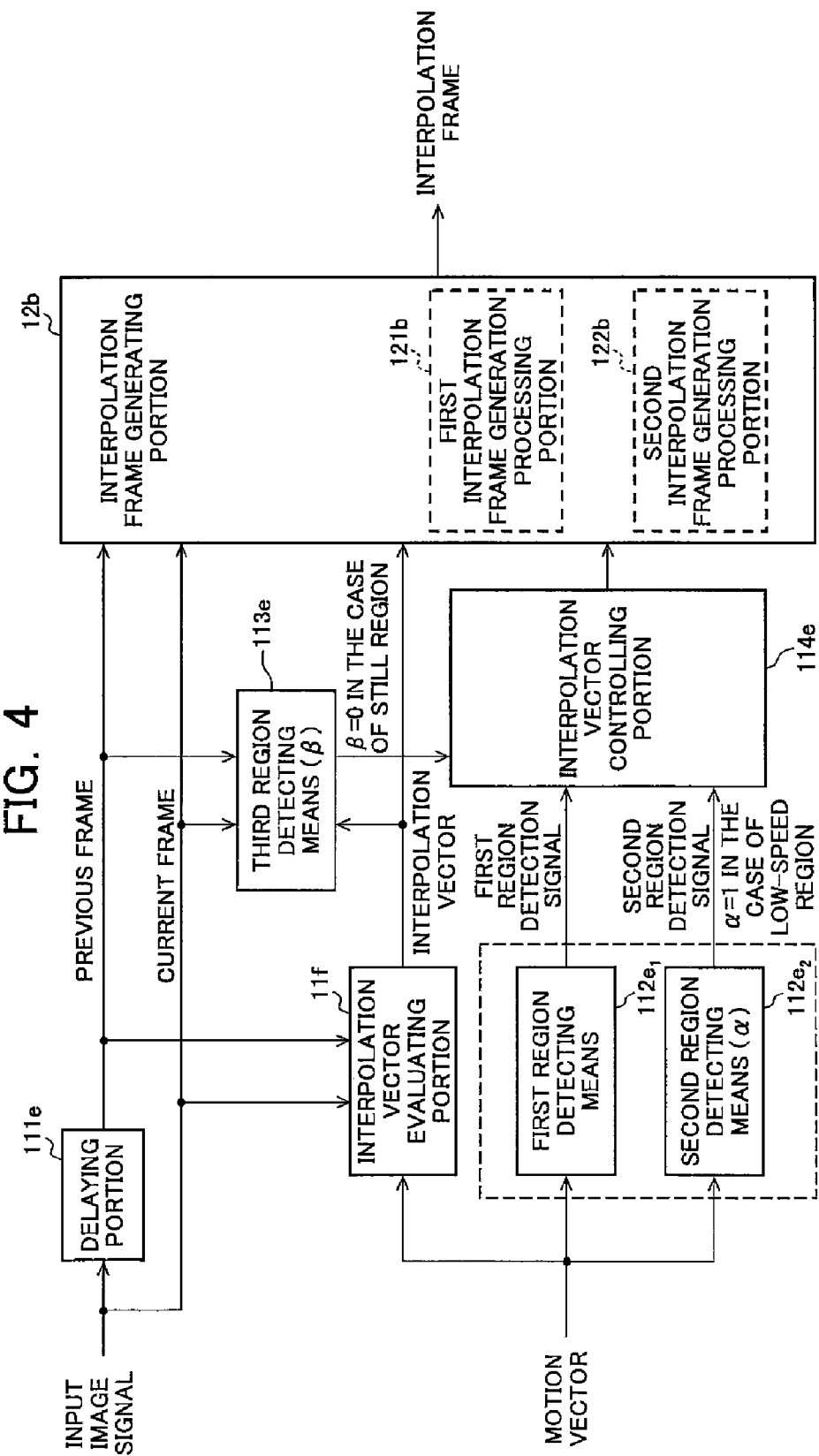
FIG. 4 is a block diagram of an outline configuration example of the interpolation frame generating process in the FRC portion of the present invention.

FIG. 4 is a block diagram of an outline configuration example of the interpolation frame generating process in the FRC portion 10 of the present invention; in FIG. 4, 111e is a delaying portion; $112e_1$ is a first region detecting means; $112e_2$ is a second region detecting means; 113e is a third region detecting means; 114e is an interpolation vector controlling portion; 11f is the interpolation vector evaluating portion; 12b is the interpolation frame generating portion; 121h is a first interpolation frame generation processing portion; and 122b is a second interpolation frame generation processing portion.

The motion vector detected by the motion vector detecting portion 11e shown in FIG. 1 is input to the interpolation vector evaluating portion 11f, the first region detecting means $112e_1$, and the second region detecting means $112e_2$. The first region detecting means $112e_1$ detects from the motion vectors a high-speed region, which is a first region including motion vectors equal to or greater than a first predetermined amount (e.g., buildings and trees in the background and a sign passing in front of a car shown in FIG. 25(A)). The second region detecting means $112e_2$ detects from the motion vectors a low-speed region, which is a second region including motion vectors equal to or smaller than a second predetermined amount (e.g., a region of the car shown in FIG. 25(A)).

The high-speed region is a region where a motion amount in a certain direction per frame period is equal to or greater than a predetermined number of pixels, and the low-speed region is a region where a motion amount in a certain direction per frame period is equal to or smaller than a predetermined number of pixels. For example, if a camera is panned for shooting, since a subject of shooting is often captured at substantially the center of a screen, small motion vectors are detected. Since the background portion of the subject of shooting moves (scrolls) at a high speed, detected motion vectors become greater than the region of the subject of shooting. Therefore, the high-speed region corresponding to the background can be separated from the low-speed region corresponding to the subject of shooting in accordance with degrees of motion vectors detected in each region.

Although the number of pixels (vector length) corresponding to the above motion amount may be different between two regions (first predetermined amount>second predetermined amount), the same value may be used for the first predetermined amount and the second predetermined amount (first predetermined amount second predetermined amount) to separate the regions such that the high-speed region and the low-speed region have motion equal to or greater than five pixels and motion less than five pixels per frame period, respectively, for example. The first region detecting means $112e_1$ and the second region detecting means $112e_2$ may detect at least two regions and may detect three or more regions. In the following description, the high-speed region is defined as a region having motion equal to or greater than five pixels per frame period and the low-speed region is defined as a region having motion less than five pixels per frame period.

In FIG. 4, the input image signal is delayed for one frame period by the delaying portion 111e, and image data of the previous frame and the current frame are input to the interpolation vector evaluating portion 11f, the third region detecting means 113e, and the interpolation frame generating portion 12b.

The third region detecting means 113e sets a β value based on, for example, a method described in above non-patent document 1 to output β=1 when Min(DFD)<FD and otherwise output β=0. That is, the third region detecting means 113e outputs β=1 for the moving region and β=0 for the still region to the interpolation vector controlling portion 114e based on the inter-frame differences. The still region means a region having no motion or slow motion between the previous frame and the current frame, in other words, a region having a value of the inter-frame difference close to zero.

If a still region detection signal (β=0) is input from the third region detecting means 113e and if a first-region (high-speed region) detection signal is input from the first region detecting means $112e_1$, the interpolation vector controlling portion 114e performs control such that the interpolation vector allocated by the interpolation vector evaluating portion 11f is input to the first interpolation frame generation processing portion 121b. The first interpolation frame generation processing portion 121b uses the interpolation vector to generate an interpolation frame for the still region in the high-speed region. The motion compensated interpolation process is executed for the still region in the high-speed region in this way.

On the other hand, If the still region detection signal (β=0) is input from the third region detecting means 113e and if a second-region (low-speed region) detection signal (α=1 which will be described later) is input from the second region detecting means $112e_2$, the interpolation vector controlling portion 114e performs control such that, for example, zero-vector is input to the second interpolation frame generation processing portion 122b instead of the interpolation vector allocated by the interpolation vector evaluating portion 11f. The second interpolation frame generation processing portion 122b uses zero-vector to generate an interpolation frame for the still region in the low-speed region. In this way, the still region in the low-speed region is subjected to an interpolation process other than the motion compensated process, for example, a zero-vector interpolation process, a linear interpolation process, an identical-frame insertion process, and a process of varying compensation intensity in the motion compensated interpolation process.

First Embodiment

In a first embodiment of the present invention, an input image is separated into the low-speed region and the high-speed region, and the motion compensation process in the FRC portion 10 is disabled by setting zero-vector for the interpolation vector of the interpolation block corresponding to the still region in the low-speed region so as to execute the zero-vector preferential interpolation process for the still region in the low-speed region and not to execute the zero-vector interpolation process for the still region in the high-speed region.

Figure 5:
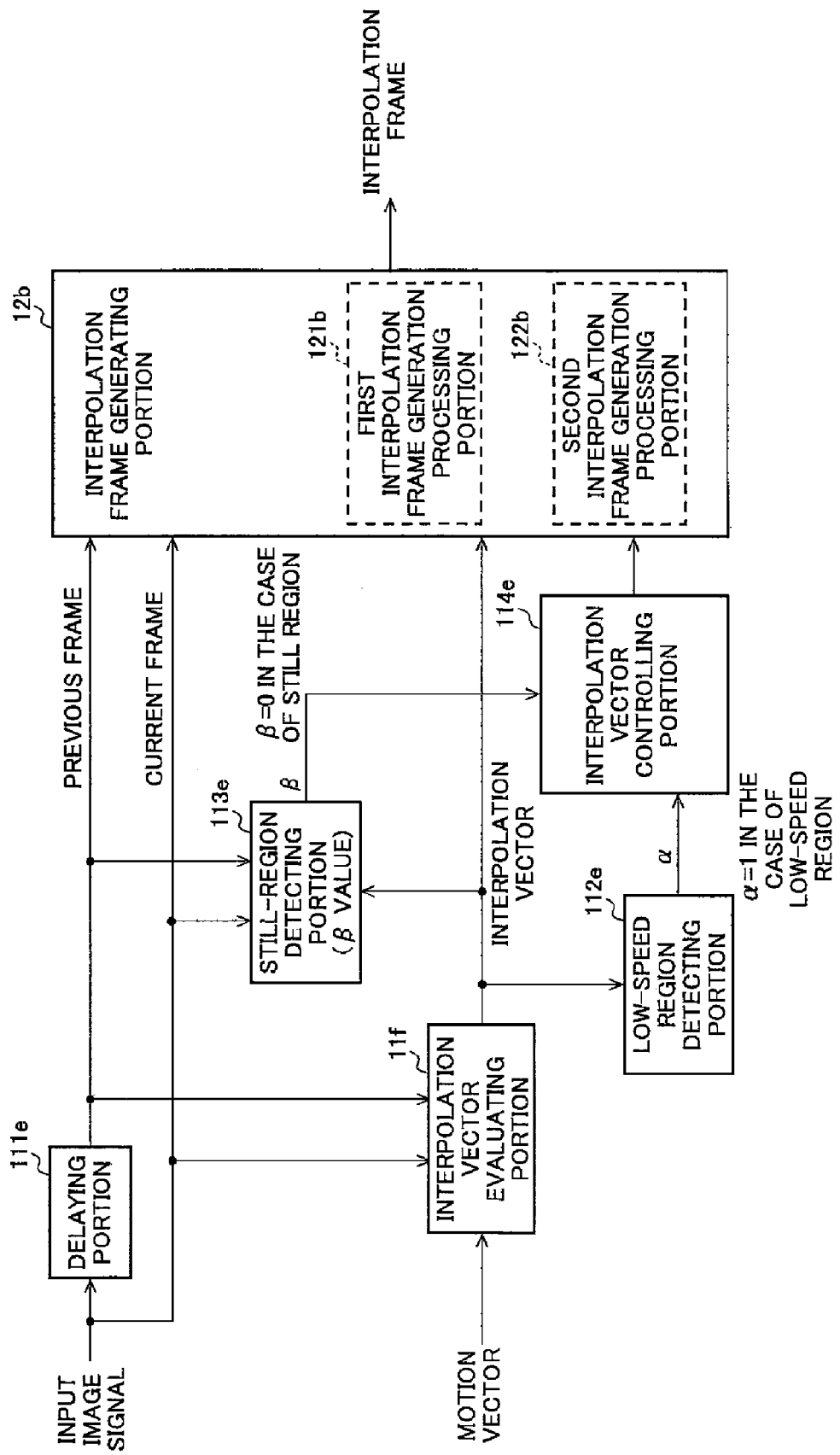
FIG. 5 is a block diagram of a main configuration example of the interpolation frame generating process according to a first embodiment of the present invention.

FIG. 5 is a block diagram of a main configuration example of the interpolation frame generating process according to the first embodiment of the present invention. The configuration of the present embodiment includes the delaying portion 111e, a low-speed region detecting portion 112e, a still-region detecting portion 113e, the interpolation vector controlling portion 114e, the first interpolation frame generation processing portion 121b, the second interpolation frame generation processing portion 122b, and the interpolation vector evaluating portion 11f. The low-speed region detecting portion 112e corresponds to the first region detecting means $112e_1$ and the second region detecting means $112e_2$ shown in FIG. 4 and the still-region detecting portion 113e corresponds to the third region detecting means 113e shown in FIG. 4.

The input image signal is delayed for one frame period by the delaying portion 111e, and image data of the previous frame and the current frame are input to the interpolation vector evaluating portion 11f, the still-region detecting portion 113e, and the interpolation frame generating portion 12b.

The interpolation vector evaluating portion 11f calculates the DFD to evaluate the motion vectors detected by the motion vector detecting portion 11e and executes a process of allocating the optimum interpolation vector (that causes the minimum DFD) to the interpolation block between the interpolation frames based on the evaluation result.

The still-region detecting portion 113e outputs β=1 when Min(DFD)<FD and otherwise outputs β=0. That is, the still-region detecting portion 113e outputs β=1 for the moving region and β=0 for the still region to the interpolation vector controlling portion 114e based on the inter-frame differences of the input image signals.

The process of detecting the low-speed region according to the embodiment uses the interpolation vector output from the interpolation vector evaluating portion 11f, and α=1 is output only when the interpolation vector is less than a predetermined amount (e.g., five pixels).

If the still region detection signal (β=0) is input from the still-region detecting portion 113e and if a high-speed region detection signal (α=0) is input from the low-speed region detecting portion 112e, the interpolation vector controlling portion 114e performs control such that the interpolation vector allocated by the interpolation vector evaluating portion 11f is input to the first interpolation frame generation processing portion 121b. The first interpolation frame generation processing portion 121b uses the interpolation vector output from the interpolation vector evaluating portion 11f to generate an interpolation frame for the still region in the high-speed region. The motion compensated interpolation process is executed for the still region in the high-speed region in this way.

On the other hand, If the still region detection signal (β=0) is input from the still-region detecting portion 113e and if a low-speed region detection signal (α=1) is input from the low-speed region detecting portion 112e, the interpolation vector controlling portion 114e performs control such that zero-vector is input to the second interpolation frame generation processing portion 122b instead of the interpolation vector allocated by the interpolation vector evaluating portion 11f. The second interpolation frame generation processing portion 122b uses zero-vector to generate an interpolation frame for the still region in the low-speed region. The zero-vector interpolation process is executed for the still region in the low-speed region in this way.

Figure 6:
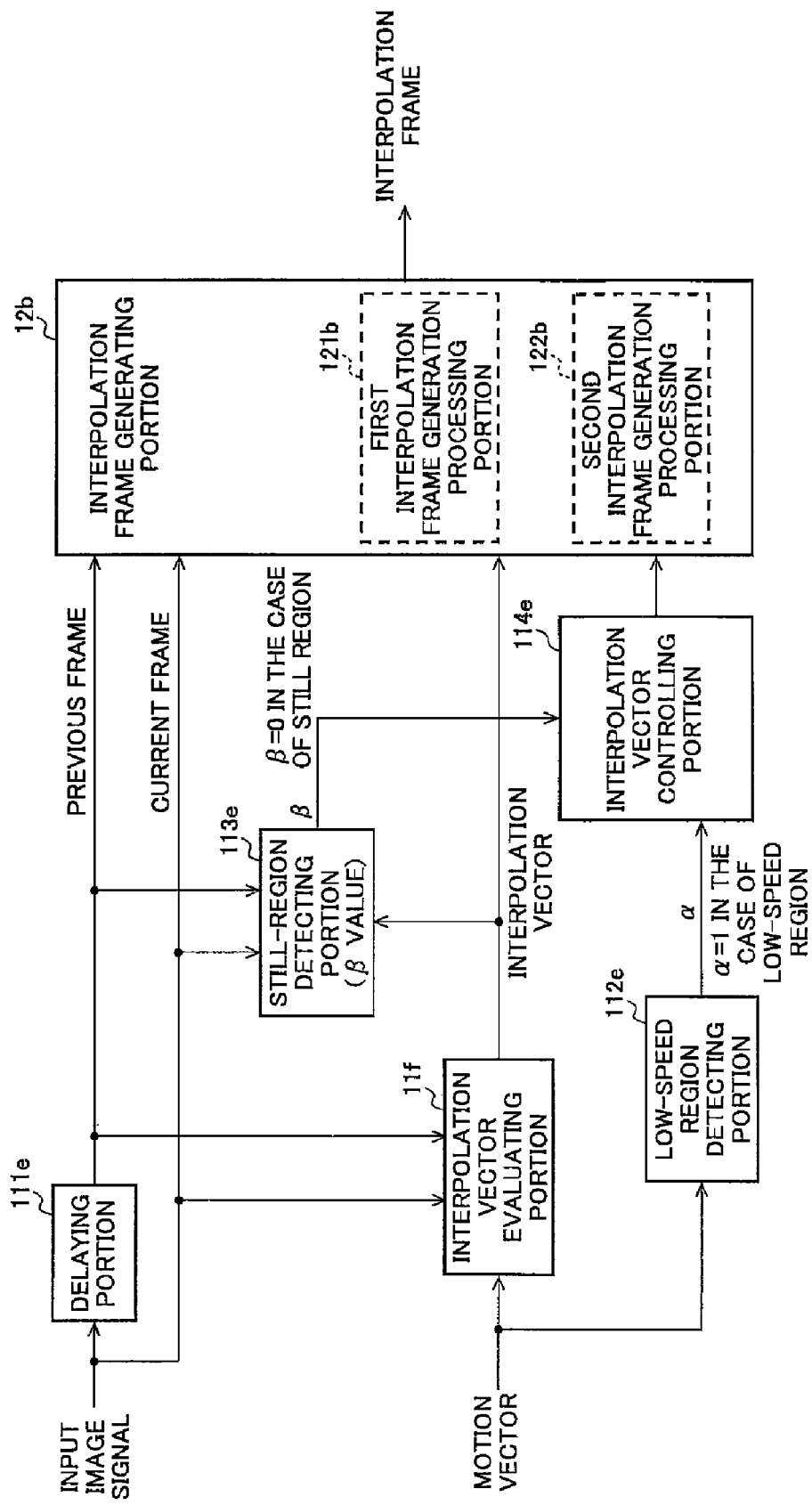
FIG. 6 is a block diagram of another example of a main configuration of the interpolation frame generating process according to the first embodiment of the present invention.

FIG. 6 is a block diagram of another example of a main configuration of the interpolation frame generating process according to the first embodiment of the present invention. As is the case with the configuration shown in FIG. 5, the configuration of the present embodiment includes the delaying portion 111e, the low-speed region detecting portion 112e, the still-region detecting portion 113e, the interpolation vector controlling portion 114e, the first interpolation frame generation processing portion 121b, the second interpolation frame generation processing portion 122b, and the interpolation vector evaluating portion 11f.

The process of detecting the low-speed region according to the embodiment uses the motion vector input to the interpolation vector evaluating portion 11f, that is, the motion vector detected by the motion vector detecting portion 11e, and α=1 is output only when the motion vector is less than a predetermined amount (e.g., five pixels).

Figure 7:
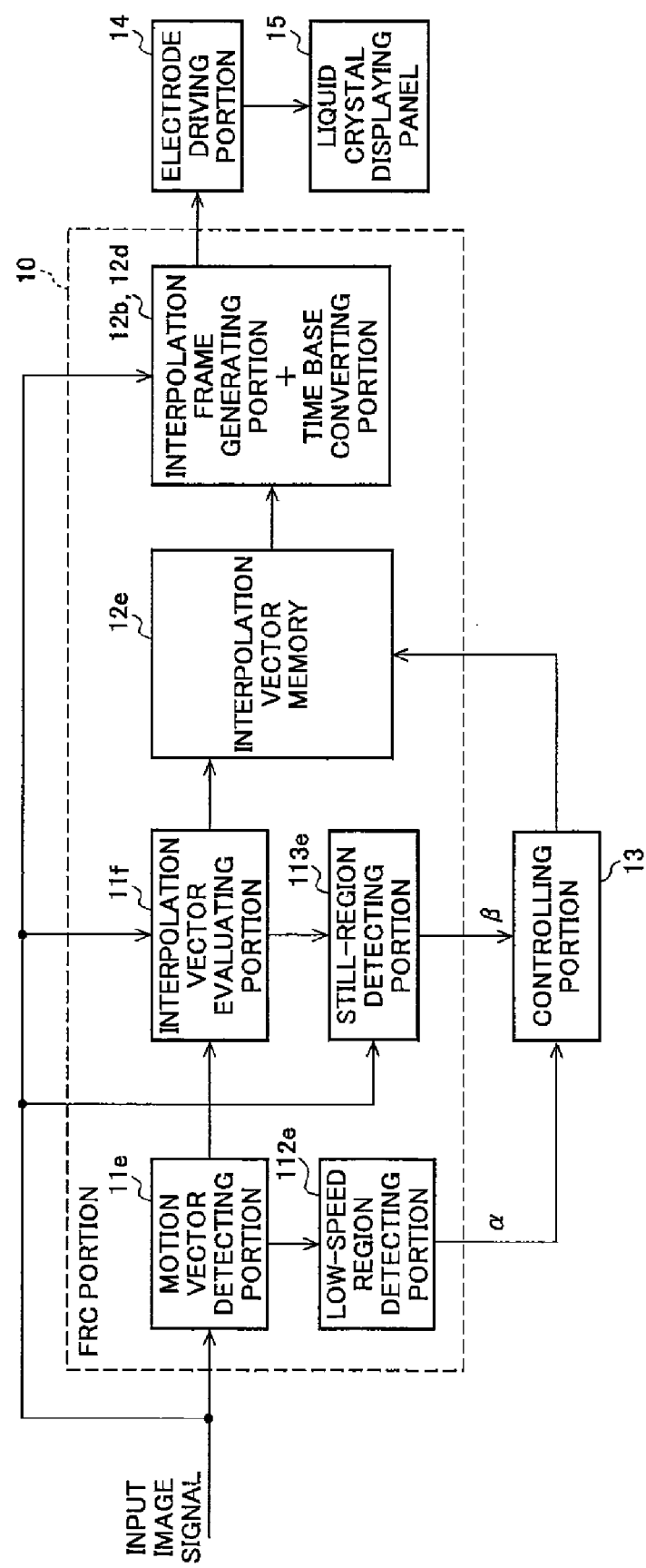
FIG. 7 is a block diagram of a main configuration example of a liquid crystal displaying apparatus according to the first embodiment of the present invention.

FIG. 7 is a block diagram of a main configuration example of a liquid crystal displaying apparatus according to the first embodiment of the present invention and the liquid crystal displaying apparatus includes the FRC portion 10, a controlling portion 13, the electrode driving portion 14, and the liquid crystal displaying panel 15. The FRC portion 10 includes the motion vector detecting portion 11e, the interpolation vector evaluating portion 11f, the interpolation frame generating portion 12b, and the time base converting portion 12d and further includes an interpolation vector memory 12e that accumulates the interpolation vector allocated by the interpolation vector evaluating portion 11f for each interpolation vector, the low-speed region detecting portion 112e, and the still-region detecting portion 11e.

The controlling portion 13 corresponds to the interpolation vector controlling portion 114e of FIGS. 4 to 6, and if α=1 is input from the low-speed region detecting portion 112e and if β=0 is input from the still-region detecting portion 113e, that is, if the still region in the low-speed region is detected, the controlling portion 13 accesses the interpolation vector memory 12e to set zero-vector for the interpolation vector of the interpolation block corresponding to the still region in the low-speed region.

If α=0 is input from the low-speed region detecting portion 112e and if β=0 is input from the still-region detecting portion 113e, that is, if the still region in the high-speed region is detected, the interpolation vector of the interpolation vector memory 12e is input to the interpolation frame generating portion 12b for the interpolation block corresponding to the still region in the high-speed region.

Specifically, when the controlling portion 13 accesses the interpolation vector memory 12e, flag information is added to the interpolation block corresponding to the still region in the low-speed region. This flag information is a flag for not using the interpolation vector of the interpolation block and is controlled such that the output becomes zero for the interpolation vector of the interpolation block with the flag information added. Setting the interpolation vector of the interpolation vector memory 12e to zero can prevent the motion compensated interpolation process from being executed.

The controlling portion 13 retains information indicating to which interpolation block (or which pixel) the still region of the low-speed region corresponds. This information is, for example, the coordinate position information of pixels, the region information of interpolation blocks, etc., and may be any information showing the pixel or region corresponding to the still region of the low-speed region. The interpolation vector of the interpolation block without the flag information is output from the interpolation vector memory 12e and input to the interpolation frame generating portion 12b and is utilized for generating the interpolation frame in the interpolation frame generating portion 12b.

Since the input image can be separated into the low-speed region and the high-speed region so as to execute the zero-vector preferential interpolation process for the still region in the low-speed region and so as not to execute the zero-vector preferential interpolation process for the still region in the high-speed region, the collapse in the high-speed region due to the zero-vector preferential interpolation process can be prevented from occurring. For regions other than above, the interpolation frame is generated with the use of the interpolation vector (without executing the zero-vector preferential interpolation process) to execute the motion compensated interpolation process.

Second Embodiment

In a second embodiment of the present invention, an input image is separated into the low-speed region and the high-speed region, and the motion compensation process in the FRC portion 10 is disabled by setting zero-vector for the interpolation vector of the interpolation block of the interpolation frame generating portion 12b corresponding to the still region in the low-speed region so as to execute the zero-vector preferential interpolation process for the still region in the low-speed region and not to execute the zero-vector interpolation process for the still region in the high-speed region.

Figure 8:
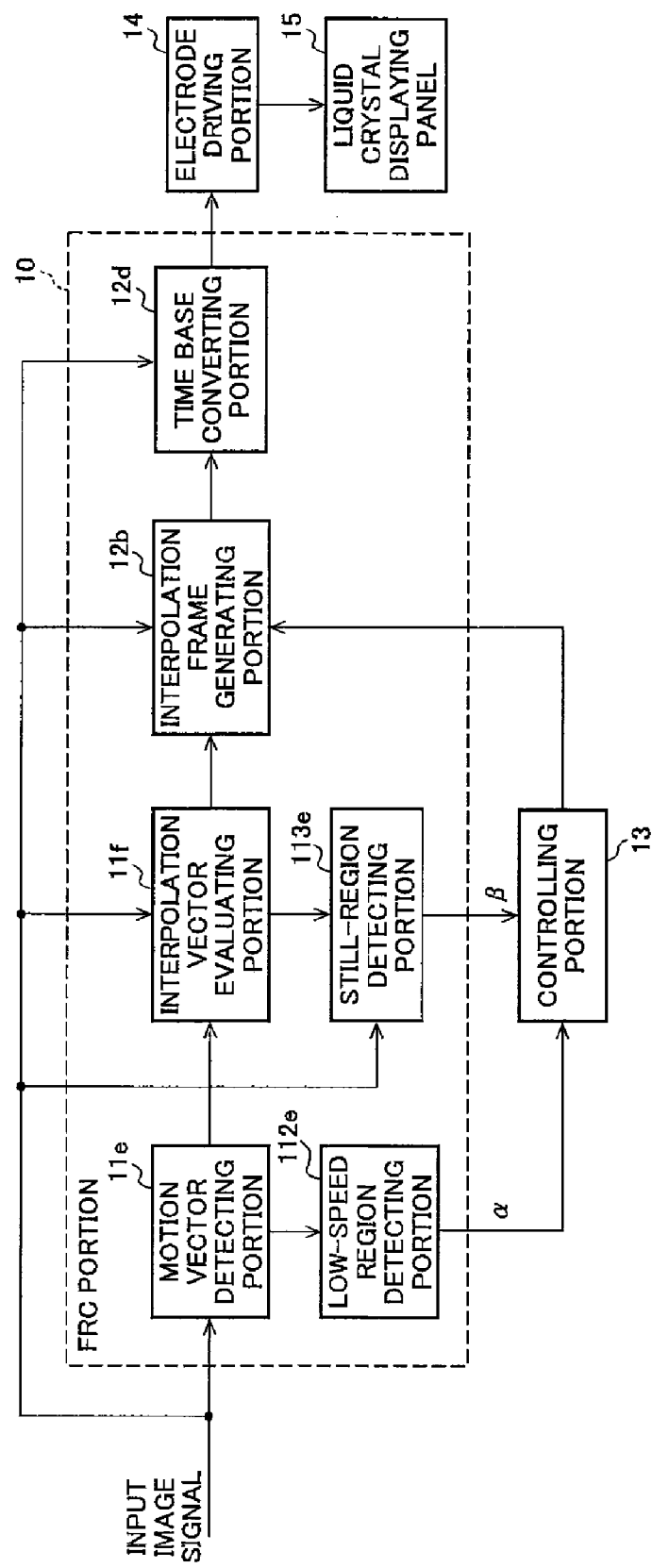
FIG. 8 is a block diagram of a main configuration example of a liquid crystal displaying apparatus according to a second embodiment of the present invention.

FIG. 8 is a block diagram of a main configuration example of a liquid crystal displaying apparatus according to the second embodiment of the present invention and the liquid crystal displaying apparatus includes the FRC portion 10, the controlling portion 13, the electrode driving portion 14, and the liquid crystal displaying panel 15. The FRC portion 10 includes the motion vector detecting portion 11e, the interpolation vector evaluating portion 11f, the interpolation frame generating portion 12b, the time base converting portion 12d, the low-speed region detecting portion 112e, and the still-region detecting portion 113e.

In FIG. 8, the interpolation frame generating portion 12b generates an interpolation frame from the interpolation vector allocated by the interpolation vector evaluating portion 11f. The controlling portion 13 corresponds to the interpolation vector controlling portion 114e of FIGS. 4 to 6, and if α=1 is input from the low-speed region detecting portion 112e and if β=0 is input from the still region detecting portion 113e, that is, if the still region in the low-speed region is detected, the controlling portion 13 accesses the interpolation frame generating portion 12b to set zero-vector for the interpolation vector of the interpolation block corresponding to the still region in the low-speed region.

If α=0 is input from the low-speed region detecting portion 112e and if β=0 is input from the still-region detecting portion 113e, that is, if the still region in the high-speed region is detected, the interpolation frame generating portion 12b generates the interpolation frame from the interpolation vector for the interpolation block corresponding to this region.

In this case, the controlling portion 13 outputs to the interpolation frame generating portion 12b the information (such as coordinate position information and region information) indicating to which interpolation block (or which pixel) the still region of the low-speed region corresponds, and the interpolation frame generating portion 12b sets zero-vector for the interpolation vector of the relevant pixel or the interpolation block including the pixel in accordance with the instruction from the controlling portion 13.

Since the input image can be separated into the low-speed region and the high-speed region so as to execute the zero-vector preferential interpolation process for the still region in the low-speed region and so as not to execute the zero-vector preferential interpolation process for the still region in the high-speed region, the collapse in the high-speed region due to the zero-vector preferential interpolation process can be prevented from occurring. For regions other than above, the interpolation frame is generated with the use of the interpolation vector (without executing the zero-vector preferential interpolation process) to execute the motion compensated interpolation process.

In the case of setting the interpolation vector to zero-vector to disable the motion compensation process of the FRC portion 10 for the still region in the low-speed region in the above embodiment, since an abrupt change in vector occurs at a boundary between the region with the motion compensation process disabled and other regions subjected to the motion compensation process, the presence and absence of the motion compensation process may clearly appear and stand out on the image.

To improve this harmful effect, it is desirable that the intensity of the motion compensation process is sequentially varied by executing a filter process such as applying a low-pass filter to the boundary between the still region in the low-speed region with the zero-vector preferential interpolation process applied and other regions. By sequentially varying the intensity of the motion compensation process, the interpolation images of the boundary between the still region in the low-speed region and other regions can be smooth serial images and this boundary can be constrained from standing out. In the following embodiments, it is also desirable that the intensity of the motion compensation process is sequentially varied by executing a filter process for the boundary between the still region in the low-speed region and other regions.

Third Embodiment

In a third embodiment of the present invention, a linear interpolation processing portion is included on a path different from the input path to the FRC portion 10; an input image is separated into the low-speed region and the high-speed region; and the image signals from the linear interpolation are interpolated into the still region in the low-speed region so as to execute the linear interpolation process for the still region in the low-speed region and to execute the motion compensated interpolation process for the still region in the high-speed region. That is, the process is switched such that the frame rate conversion is performed by executing the linear interpolation process without executing the motion compensated interpolation process for a pixel corresponding to the still region in the low-speed region or a region including the pixel.

Figure 9:
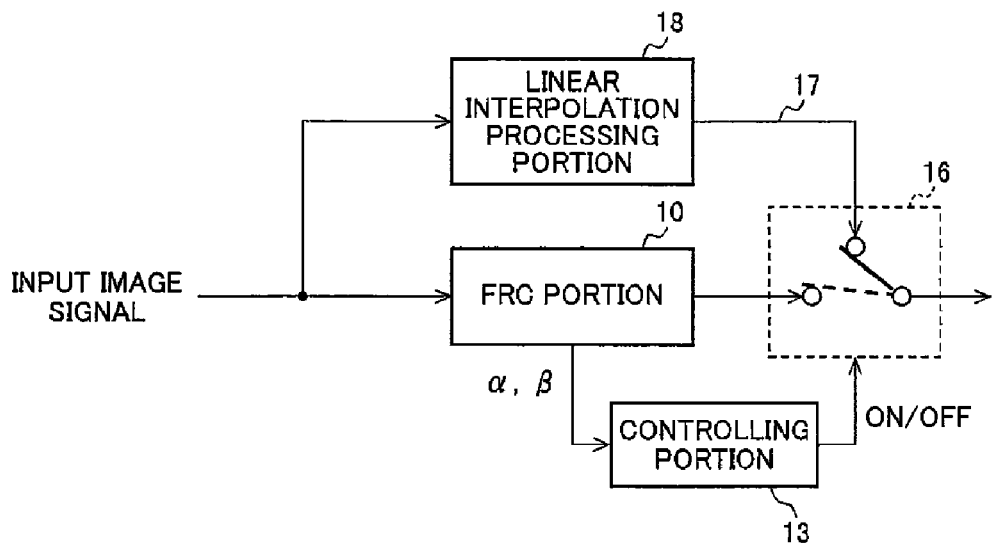
FIG. 9 is a block diagram of a main configuration example of a liquid crystal displaying apparatus according to a third embodiment of the present invention.

FIG. 9 is a block diagram of a main configuration example of a liquid crystal displaying apparatus according to the third embodiment of the present invention and the liquid crystal displaying apparatus includes the FRC portion 10, the controlling portion 13, a switching portion 16, a path 17 disposed separately from the input path to the FRC portion 10, and a linear interpolation processing portion 18 on the path 17. The descriptions of the electrode driving portion 14 and the liquid crystal displaying panel 15 are omitted.

The switching portion 16 is disposed on the subsequent stage of the FRC portion 10 and switches whether the image signal (motion compensation image) from the FRC portion 10 or the image signal (linear interpolation image) from the linear interpolation processing portion 18 is output in accordance with the instruction from the controlling portion 13.

If $\alpha=1$ and $\beta=0$ are input from the low-speed region detecting portion 112e and the still-region detecting portion 113e disposed in the FRC portion 10 respectively, that is, if the still region in the low-speed region is detected, the controlling portion 13 switches the switching portion 16 to the path 17 (the linear interpolation processing portion 18) side for a pixel corresponding to this region or a region including the pixel to output to the displaying panel the display image signal generated by interpolating the image signal subjected to the linear interpolation process between the frames of the input image signal. In this case, the linear interpolation processing portion 18 executes a process of inserting the interpolation frame subjected to the linear interpolation process between the frames of the input image signal.

If $\alpha=0$ and $\beta=0$ are input from the low-speed region detecting portion 112e and the still-region detecting portion 113e respectively, that is, if the still region in the high-speed region is detected, the controlling portion 13 switches the switching portion 16 to the FRC portion 10 side for a pixel corresponding to this region or a region including the pixel to output to the displaying panel the display image signal subjected to the FRC process (motion compensated frame interpolation process) between the frames of the input image signal.

In the above linear interpolation process, the interpolation frame is acquired by applying the linear interpolation using a frame interpolation ratio $\gamma$ from the signal of the previous frame and the signal of the current frame.

Since the input image can be separated into the low-speed region and the high-speed region so as to execute the linear interpolation process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Fourth Embodiment

In a fourth embodiment of the present invention, a memory is included on a path different from the input path to the FRC portion 10; an input image is separated into the low-speed region and the high-speed region; and frame rate conversion for the still region in the low-speed region is performed by making the switch to the memory side to repeatedly read an image signal of the same frame from the memory for a plurality of times at a high speed so as to execute an identical-frame insertion process for the still region in the low speed region and to execute the motion compensation process for the still region in the high-speed region. That is, the process is switched such that the frame rate conversion is performed by continuously outputting the input image signal at a high speed without executing the motion compensated interpolation process for a pixel corresponding to the still region in the low-speed region or a region including the pixel.

Figure 10:
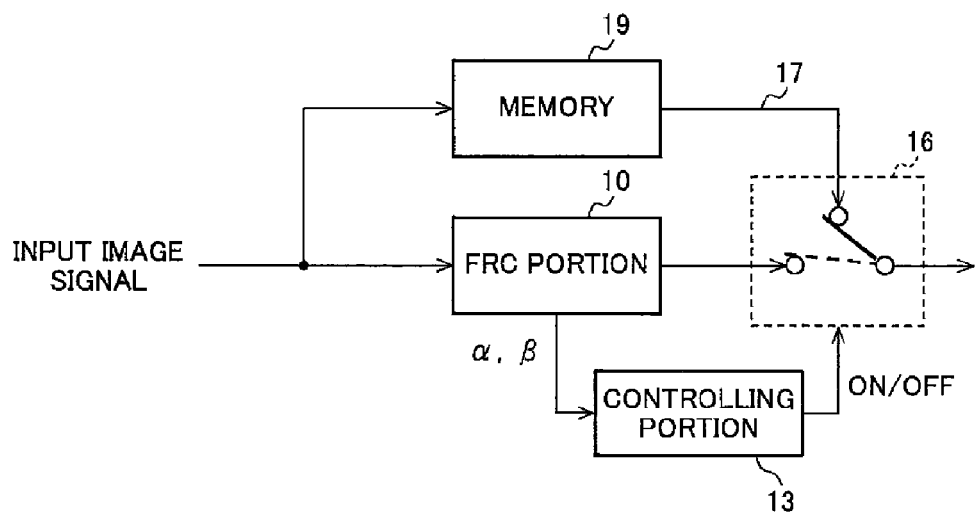
FIG. 10 is a block diagram of a main configuration example of a liquid crystal displaying apparatus according to a fourth embodiment of the present invention.

FIG. 10 is a block diagram of a main configuration example of a liquid crystal displaying apparatus according to the fourth embodiment of the present invention and the liquid crystal displaying apparatus includes the FRC portion 10, the controlling portion 13, the switching portion 16, the path 17 disposed separately from the input path to the FRC portion 10, and a memory 19 on the path 17. The descriptions of the electrode driving portion 14 and the liquid crystal displaying panel 15 are omitted. The switching portion 16 is disposed on the subsequent stage of the FRC portion 10 and switches whether the image signal (motion compensation image) from the FRC portion 10 or the image signal of the previous or subsequent frame from the memory 19 is output in accordance with the instruction from the controlling portion 13.

If $\alpha=1$ and $\beta=0$ are input from the low-speed region detecting portion 112e and the still-region detecting portion 113e disposed in the FRC portion 10 respectively, that is, if the still region in the low-speed region is detected, the controlling portion 13 switches the switching portion 16 to the path 17 (the memory 19) side for a pixel corresponding to this region or a region including the pixel to output to the displaying panel the display image signal generated by repeatedly reading from the memory 19 and inserting the image signal of the previous or subsequent frame between the frames of the input image signal. The input image signals are accumulated in the memory 19, and when the still region in the low-speed region is detected, the image signal of a pixel corresponding to this region or a region including the pixel is repeatedly read out.

If $\alpha=0$ and $\beta=0$ are input from the low-speed region detecting portion 112e and the still-region detecting portion 113e respectively, that is, if the still region in the high-speed region is detected, the controlling portion 13 switches the switching portion 16 to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region so as to execute the identical-frame insertion process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Fifth Embodiment

In a fifth embodiment of the present invention, a linear interpolation processing portion is included on a path different from the input path to the FRC portion 10 as is the case with the above third embodiment; an input image is separated into the low-speed region and the high-speed region; and the image signals from the linear interpolation are interpolated into the still region in the low-speed region so as to execute the linear interpolation process for the still region in the low-speed region and to execute the motion compensated interpolation process for the still region in the high-speed region. That is, the process is switched such that the frame rate conversion is performed by executing the linear interpolation process without executing the motion compensated interpolation process for a pixel corresponding to the still region in the low-speed region or a region including the pixel.

Figure 11:
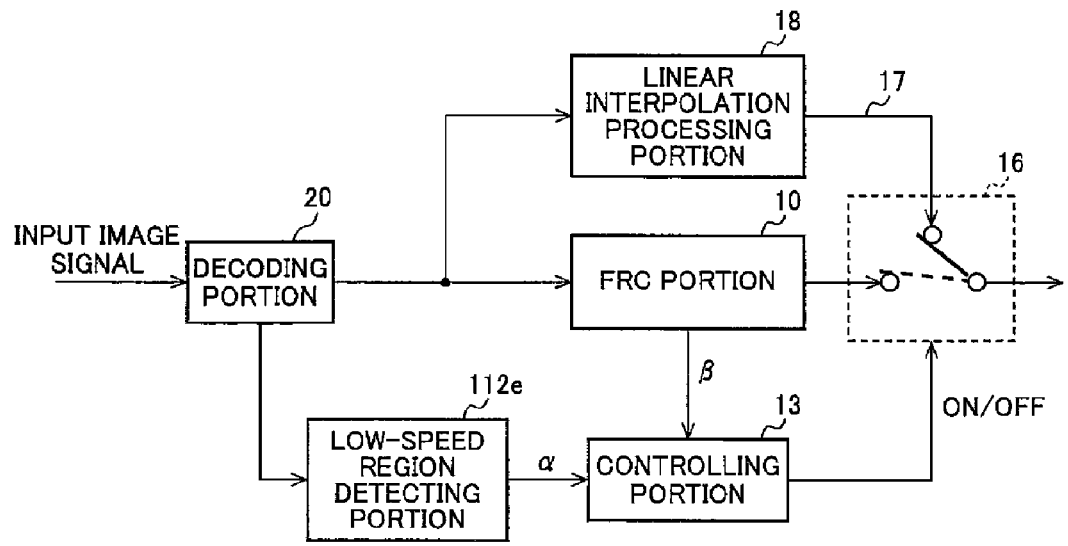
FIG. 11 is a block diagram of a main configuration example of an FRC portion according to a fifth embodiment of the present invention.

FIG. 11 is a block diagram of a main configuration example of a liquid crystal displaying apparatus according to the fifth embodiment of the present invention and the liquid crystal displaying apparatus includes the FRC portion 10, the controlling portion 13, the switching portion 16, a decoding portion 20, the low-speed region detecting portion 112e, the path 17 disposed separately from the input path to the FRC portion 10, and the linear interpolation processing portion 1B on the path 17. The descriptions of the electrode driving portion 14 and the liquid crystal displaying panel 15 are omitted. In this embodiment, the low-speed region detecting portion 112e is disposed on the outside of the FRC portion 10.

If the input image signal is a compressed input signal (e.g., MPEG and DivX) that is compressed by using motion vector information, this compressed input signal is decompressed by the decoding portion 20 and input to the FRC portion 10. In this case, since the motion vector used for the decompression is added to the input image signal if the input image signal is compressed by using the motion vector information, the motion vector can be extracted from the decoding portion 20. In this embodiment, the low-speed region is determined by the low-speed region detecting portion 112e based on the extracted motion vector to output the α value.

The switching portion 16 is disposed on the subsequent stage of the FRC portion 10 and switches whether the image signal (motion compensation image) from the FRC portion 10 or the image signal (linear interpolation image) from the linear interpolation processing portion 18 is output in accordance with the instruction from the controlling portion 13.

If α=1 is input from the low-speed region detecting portion 112e and β=0 is input from the still-region detecting portion 113e disposed in the FRC portion 10 respectively, that is, if the still region in the low-speed region is detected, the controlling portion 13 switches the switching portion 16 to the path 17 (the linear interpolation processing portion 18) side for a pixel corresponding to this region or a region including the pixel to output to the displaying panel the display image signal generated by interpolating the image signal subjected to the linear interpolation process between the frames of the input image signal. In this case, the linear interpolation processing portion 18 executes a process of inserting the interpolation frame subjected to the linear interpolation process between the frames of the input image signal for a pixel corresponding to the still region in the low-speed region or a region including the pixel.

If α=0 is input from the low-speed region detecting portion 112e and β=0 is input from the still-region detecting portion 113e disposed in the FRC portion 10, that is, if the still region in the high-speed region is detected, the controlling portion 13 switches the switching portion 16 to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region so as to execute the linear interpolation process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Sixth Embodiment

In a sixth embodiment of the present invention, a memory is included on a path different from the input path to the FRC portion 10 as is the case with the above fourth embodiment; an input image is separated into the low-speed region and the high-speed region; and frame rate conversion for the still region in the low-speed region is performed by making the switch to the memory side to repeatedly read an image signal of the same frame from the memory for a plurality of times at a high speed so as to execute the identical-frame insertion process for the still region in the low-speed region and to execute the motion compensation process for the still region in the high-speed region. That is, the process is switched such that the frame rate conversion is performed by continuously outputting the input image signal at a high speed without executing the motion compensated interpolation process for a pixel corresponding to the still region in the low-speed region or a region including the pixel.

Figure 12:
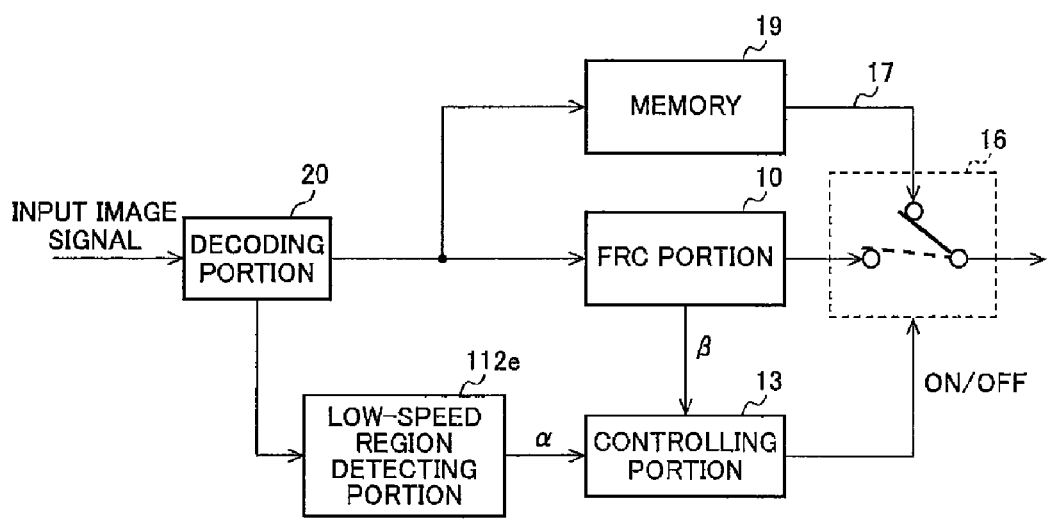
FIG. 12 is a block diagram of a main configuration example of the interpolation frame generating process according to a sixth embodiment of the present invention.

FIG. 12 is a block diagram of a main configuration example of a liquid crystal displaying apparatus according to the sixth embodiment of the present invention and the liquid crystal displaying apparatus includes the FRC portion 10, the controlling portion 13, the switching portion 16, the decoding portion 20, the low-speed region detecting portion 112e, the path 17 disposed separately from the input path to the FRC portion 10, and a memory 19 on the path 17. The descriptions of the electrode driving portion 14 and the liquid crystal displaying panel 15 are omitted. In this embodiment, the low-speed region detecting portion 112e is disposed on the outside of the FRC portion 10.

The decoding portion 20 decompresses the compressed input signal into the image signal, which is input to the FRC portion 10, and inputs the motion vector information used for the decompression to the low-speed region detecting portion 112e. Based on the motion vector extracted by the decoding portion 20, the low-speed region detecting portion 112e determines the low-speed region and outputs the a value.

The switching portion 16 is disposed on the subsequent stage of the FRC portion 10 and switches whether the image signal (motion compensation image) from the FRC portion 10 or the image signal of the previous or subsequent frame from the memory 19 is output in accordance with the instruction from the controlling portion 13.

If α=1 is input from the low-speed region detecting portion 112e and β=0 is input from the still-region detecting portion 113e disposed in the FRC portion 10, that is, if the still region in the low-speed region is detected, the controlling portion 13 switches the switching portion 16 to the path 17 (the memory 19) side for a pixel corresponding to this region or a region including the pixel to output to the displaying panel the display image signal generated by repeatedly reading from the memory 19 and inserting the image signal of the previous or subsequent frame between the frames of the input image signal. The input image signals are accumulated in the memory 19, and when the still region in the low-speed region is detected, the image signal of a pixel corresponding to this region or a region including the pixel is repeatedly read out.

If α=0 is input from the low-speed region detecting portion 112e and β=0 is input from the still-region detecting portion 113e disposed in the FRC portion 10, that is, if the still region in the high-speed region is detected, the controlling portion 13 switches the switching portion 16 to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region so as to execute the identical-frame insertion process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Although the switching control of the switching portion 16 is performed based on the α and β values input to the controlling portion 13 to disable the motion compensation process in the fifth and sixth embodiments, it is needless to say that the interpolation vector may be controlled in accordance with the α and β values as is the case with the first and second embodiments.

Seventh Embodiment

In a seventh embodiment of the present invention, a linear interpolation processing portion is included on a path different from the input path to the FRC portion 10 as is the case with the above third embodiment; an input image is separated into the low-speed region and the high-speed region; and the image signals from the linear interpolation are interpolated into the still region in the low-speed region so as to execute the linear interpolation process for the still region in the low-speed region and to execute the motion compensated interpolation process for the still region in the high-speed region. That is, the process is switched such that the frame rate conversion is performed by executing the linear interpolation process without executing the motion compensated interpolation process for a pixel corresponding to the still region in the low-speed region or a region including the pixel.

Figure 13:
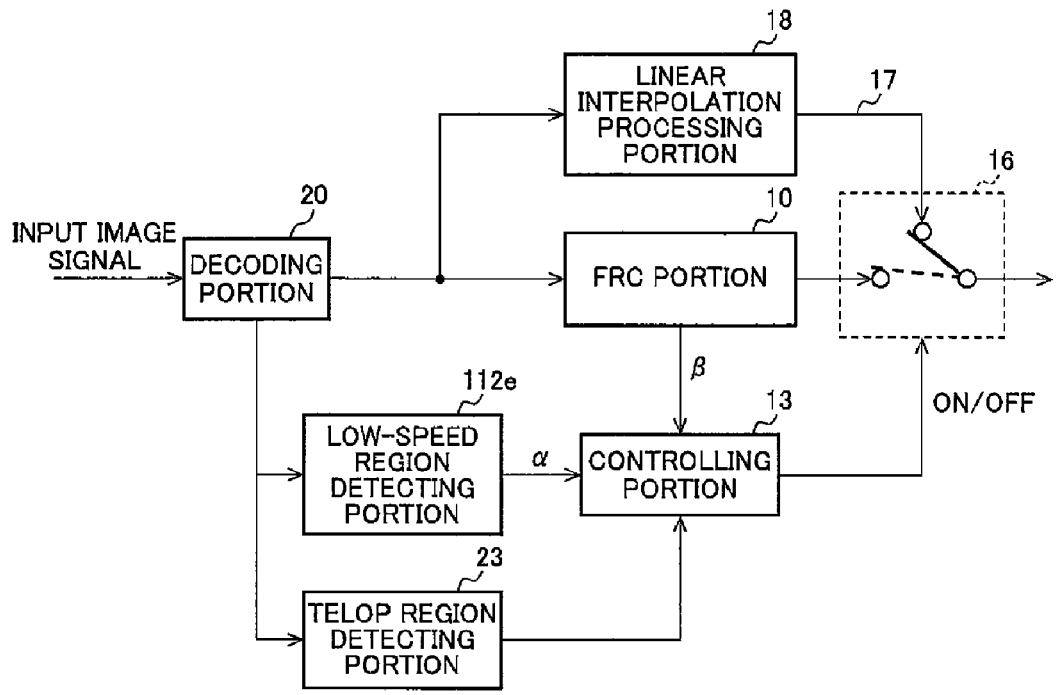
FIG. 13 is a block diagram of a main configuration example of the interpolation frame generating process according to a seventh embodiment of the present invention.

FIG. 13 is a block diagram of a main configuration example of a liquid crystal displaying apparatus according to the seventh embodiment of the present invention and the liquid crystal displaying apparatus includes the FRC portion 10, the controlling portion 13, the switching portion 16, the decoding portion 20, the low-speed region detecting portion 112e, a telop region detecting portion 21, the path 17 disposed separately from the input path to the FRC portion 10, and the linear interpolation processing portion 18 on the path 17. The descriptions of the electrode driving portion 14 and the liquid crystal displaying panel 15 are omitted. In this embodiment, the low-speed region detecting portion 112e is disposed on the outside of the FRC portion 10.

The decoding portion 20 decompresses the compressed input signal into the image signal, which is input to the FRC portion 10, and inputs the motion vector information used for the decompression to the low-speed region detecting portion 112e and the telop region detecting portion 21. Based on the motion vector extracted by the decoding portion 20, the low-speed region detecting portion 112e determines the low-speed region and outputs the α value.

In some input image signals, a telop (such as characters moving (scrolling) in a certain direction at a certain speed) is added in a broadcast station to a video shot by a camera. Considering that the image is separated into the low-speed region and the high-speed region as above, if such an image is input, a region with the telop added should be the high-speed region so as not to execute the zero-vector interpolation process.

However, since the telop includes characters configured by thin lines and it is difficult to determine that such characters are the high-speed regions, these characters may be partially determined as the low-speed region, which is subjected to the zero-vector interpolation process, resulting in the collapse in the interpolation images (as in the case of FIG. 25(C)). Therefore, in this embodiment, a telop region is preliminarily detected and the telop region is determined as the high-speed region (i.e., α=0) so as not to execute the zero-vector preferential interpolation process for the still region of the telop region.

Various known technologies can be used for the telop region detecting method in the telop region detecting portion 21. For example, the telop region may be detected as a region where motion vectors with a certain velocity (vector length) are concentrated, or since the telop often scrolls in the horizontal direction, it may determine whether a multiplicity of motion vectors with similar velocities (vector lengths) exists or not for each horizontal band-like region of the display screen to define a horizontal band-like region as the telop region if the region includes a multiplicity of motion vectors with similar velocities (vector lengths).

In a method proposed in the specification of Japanese Patent Application No. 2006-325139 filed by the same applicant, an average value of the motion vectors detected in a band-like region is obtained for each horizontal band-like region of the display screen to estimate a band-like region including a telop through a statistical process based on these values, and this method may be used to detect the telop region.

In this embodiment, the pixel region detected as the telop region by the telop region detecting portion 21 is determined as the high-speed region (i.e., α=0) so that the telop region is certainly processed as the high-speed region.

The switching portion 16 is disposed on the subsequent stage of the FRC portion 10 and switches whether the image signal (motion compensation image) from the FRC portion 10 or the image signal (linear interpolation image) from the linear interpolation processing portion 18 is output in accordance with the instruction from the controlling portion 13.

The controlling portion 13 receives information (such as coordinate position information and region information) of a pixel region detected as the telop region by the telop region detecting portion 21 and rewrites the α value corresponding to the pixel region detected as the telop region into α=0 for the α values output from the low-speed region detecting portion 112e. The switching portion 16 is controlled based on this α value and the β value output from the still-region detecting portion 113e disposed in the FRC portion 10.

After the α value is updated and set by the controlling portion 13 based on the telop region detection result, if α=1 and β=0 are determined, that is, if a region is determined as the still region in the low-speed region, the switching portion 16 is switched to the path 17 (the linear interpolation processing portion 18) side for a pixel corresponding to this region or a region including the pixel to output to the displaying panel the display image signal generated by interpolating the image signal subjected to the linear interpolation process between the frames of the input image signal. In this case, the linear interpolation processing portion 18 executes a process of inserting the interpolation frame subjected to the linear interpolation process between the frames of the input image signal for a pixel corresponding to the still region in the low-speed region or a region including the pixel.

Alternatively, after the α value is updated and set by the controlling portion 13 based on the telop region detection result, if α=0 and β=0 are determined, that is, if a region is determined as the still region in the high-speed region, the switching portion 16 is switched to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region and the control can be performed such that the telop region is certainly determined as the high-speed region so as to execute the linear interpolation process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Eighth Embodiment

In an eighth embodiment of the present invention, a memory is included on a path different from the input path to the FRC portion 10 as is the case with the above fourth embodiment; an input image is separated into the low-speed region and the high-speed region; and frame rate conversion for the still region in the low-speed region is performed by making the switch to the memory side to repeatedly read an image signal of the same frame from the memory for a plurality of times at a high speed so as to execute the identical-frame insertion process for the still region in the low-speed region and to execute the motion compensation process for the still region in the high-speed region. That is, the process is switched such that the frame rate conversion is performed by continuously outputting the input image signal at a high speed without executing the motion compensated interpolation process for a pixel corresponding to the still region in the low-speed region or a region including the pixel.

Figure 14:
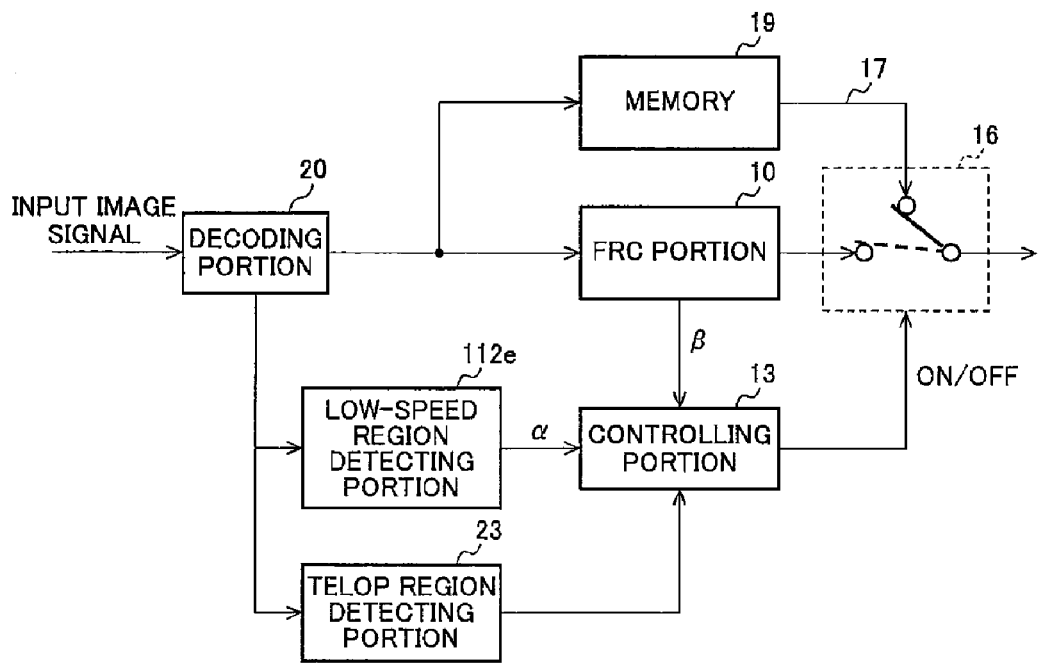
FIG. 14 is a block diagram of a main configuration example of the interpolation frame generating process according to an eighth embodiment of the present invention.

FIG. 14 is a block diagram of a main configuration example of a liquid crystal displaying apparatus according to the eighth embodiment of the present invention and the liquid crystal displaying apparatus includes the FRC portion 10, the controlling portion 13, the switching portion 16, the decoding portion 20, the low-speed region detecting portion 112e, the telop region detecting portion 21, the path 17 disposed separately from the input path to the FRC portion 10, and a memory 19 on the path 17. The descriptions of the electrode driving portion 14 and the liquid crystal displaying panel 15 are omitted. In this embodiment, the low-speed region detecting portion 112e is disposed on the outside of the FRC portion 10.

The decoding portion 20 decompresses the compressed input signal into the image signal, which is input to the FRC portion 10, and inputs the motion vector information used for the decompression to the low-speed region detecting portion 112e. Based on the motion vector extracted by the decoding portion 20, the low-speed region detecting portion 112e determines the low-speed region and outputs the α value.

The telop region detecting portion 21 detects the pixel region including a telop based on the motion vector information output from the decoding portion 20. In this embodiment, the pixel region detected as the telop region by the telop region detecting portion 21 is determined as the high-speed region (i.e., α=0) so that the telop region is certainly processed as the high-speed region.

The switching portion 16 is disposed on the subsequent stage of the FRC portion 10 and switches whether the image signal (motion compensation image) from the FRC portion 10 or the image signal of the previous or subsequent frame from the memory 19 is output in accordance with the instruction from the controlling portion 13.

The controlling portion 13 receives information (such as coordinate position information and region information) of a pixel region detected as the telop region by the telop region detecting portion 21 and rewrites the α value corresponding to the pixel region detected as the telop region into and for the α values output from the low-speed region detecting portion 112e. The switching portion 16 is controlled based on this α value and the β value output from the still-region detecting portion 113e disposed in the FRC portion 10.

After the α value is updated and set by the controlling portion 13 based on the telop region detection result, if α=1 and β=0 are determined, that is, if a region is determined as the still region in the low-speed region, the switching portion 16 is switched to the path 17 (the memory 19) side for a pixel corresponding to this region or a region including the pixel to output to the displaying panel the display image signal generated by repeatedly reading from the memory 19 and inserting the image signal of the previous or subsequent frame between the frames of the input image signal. The input image signals are accumulated in the memory 19, and when the still region in the low-speed region is detected, the image signal of a pixel corresponding to this region or a region including the pixel is repeatedly read out.

After the α value is updated and set by the controlling portion 13 based on the telop region detection result, if α=0 and β=0 are determined, that is, if a region is determined as the still region in the high-speed region, the switching portion 16 is switched to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region and the control can be performed such that the telop region is certainly determined as the high-speed region so as to execute the identical-frame insertion process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Although the switching control of the switching portion 16 is performed based on the α and β values determined by the controlling portion 13 to disable the motion compensation process in the seventh and eighth embodiments, it is needless to say that the interpolation vector may be controlled in accordance with the α and β values as is the case with the first and second embodiments.

Ninth Embodiment

In a ninth embodiment of the present invention, a linear interpolation processing portion is included on a path different from the input path to the FRC portion 10 as is the case with the above third embodiment; if a high-speed scrolling image is input, the input image is separated into the low-speed region and the high-speed region; and the image signals from the linear interpolation are interpolated into the still region in the low-speed region so as to execute the linear interpolation process for the still region in the low-speed region and to execute the motion compensated interpolation process for the still region in the high-speed region. That is, the process is switched such that the frame rate conversion is performed by executing the linear interpolation process without executing the motion compensated interpolation process for a pixel corresponding to the still region in the low-speed region or a region including the pixel.

Figure 15:
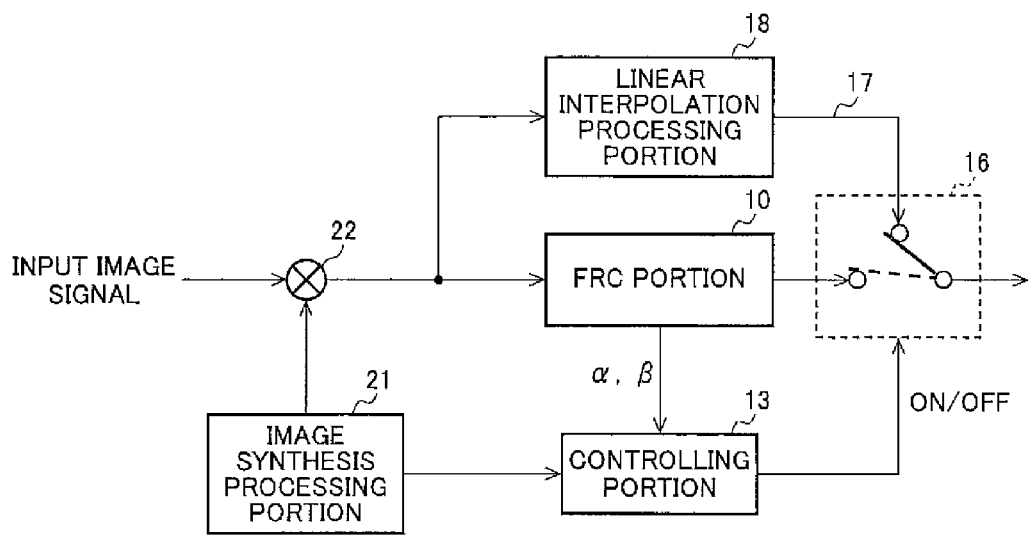
FIG. 15 is a block diagram of a main configuration example of the interpolation frame generating process according to a ninth embodiment of the present invention.

FIG. 15 is a block diagram of a main configuration example of a liquid crystal displaying apparatus according to the ninth embodiment of the present invention and the liquid crystal displaying apparatus includes the FRC portion 10, the controlling portion 13, the switching portion 16, an image synthesis processing portion 22, a synthesizing portion 23, the path 17 disposed separately from the input path to the FRC portion 10, and the linear interpolation processing portion 18 on the path 17. The descriptions of the electrode driving portion 14 and the liquid crystal displaying panel 15 are omitted.

The image synthesis processing portion 22 generates a second image signal related to a still image such as letters and characters (e.g., on-screen display (OSD) signals generated within the image displaying apparatus and data information display signals acquired by receiving the data broadcast), which is different from the input image signal. The second image signal generated by the image synthesis processing portion 22 is controlled in accordance with instructions and operations performed by a user with the use of a remote controller (remote controlling apparatus), etc.

The synthesizing portion 23 combines (overlaps) the second image signal from the image synthesis processing portion 22 with the input image signal. In this embodiment, the pixel region combined with the second image signal is determined as the low-speed region (i.e., $\alpha=1$) so that the region combined with the second image signal is certainly determined as the still region in the low-speed region.

The switching portion 16 is disposed on the subsequent stage of the FRC portion 10 and switches whether the image signal (motion compensation image) from the FRC portion 10 or the image signal (linear interpolation image) from the linear interpolation processing portion 18 is output in accordance with the instruction from the controlling portion 13.

The controlling portion 13 receives information (such as coordinate position information and region information) of a pixel region combined with second image signal by the image synthesis processing portion 22 and rewrites the $\alpha$ value corresponding to the pixel region combined with the second image signal into $\alpha=1$ for the $\alpha$ values output from the low-speed region detecting portion 112e disposed in the FRC portion 10. The switching portion 16 is controlled based on this $\alpha$ value and the $\beta$ value output from the still-region detecting portion 113e disposed in the FRC portion 10.

After the $\alpha$ value is updated and set by the controlling portion 13 based on image synthesis position information, if $\alpha=1$ and $\beta=0$ are determined, that is, if a region is determined as the still region in the low-speed region, the switching portion 16 is switched to the path 17 (the linear interpolation processing portion 18) side for a pixel corresponding to this region or a region including the pixel to output to the displaying panel the display image signal generated by interpolating the image signal subjected to the linear interpolation process between the frames of the input image signal. In this case, the linear interpolation processing portion 18 executes a process of inserting the interpolation frame subjected to the linear interpolation process between the frames of the input image signal for a pixel corresponding to the still region in the low-speed region or a region including the pixel.

Alternatively, after the $\alpha$ value is updated and set by the controlling portion 13 based on the image synthesis position information, if $\alpha=0$ and $\beta=0$ are determined, that is, if a region is determined as the still region in the high-speed region, the switching portion 16 is switched to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region so as to execute the linear interpolation process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Since the interpolation process of the linear interpolation image can be executed for the still image portion combined with the second image signal, which is certainly determined as the still image in the low-speed region, the image quality can be prevented from deteriorating due to the motion compensated interpolation process.

Tenth Embodiment

In a tenth embodiment of the present invention, a memory is included on a path different from the input path to the FRC portion 10 as is the case with the above fourth embodiment; an input image is separated into the low-speed region and the high-speed region; and frame rate conversion for the still region in the low-speed region is performed by making the switch to the memory side to repeatedly read an image signal of the same frame from the memory for a plurality of times at a high speed so as to execute the identical-frame insertion process for the still region in the low-speed region and to execute the motion compensation process for the still region in the high-speed region. That is, the process is switched such that the frame rate conversion is performed by continuously outputting the input image signal at a high speed without executing the motion compensated interpolation process for a pixel corresponding to the still region in the low-speed region or a region including the pixel.

Figure 16:
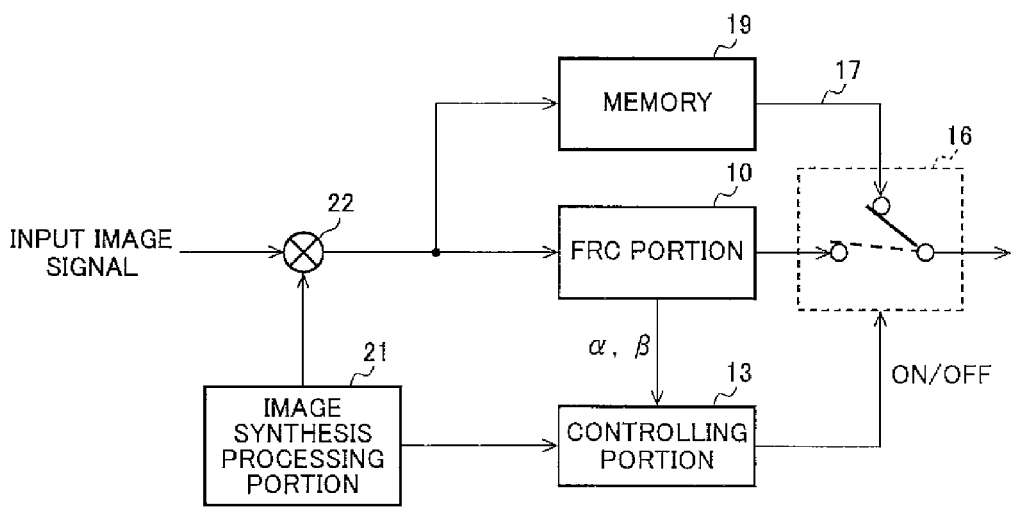
FIG. 16 is a block diagram of a main configuration example of the interpolation frame generating process according to a tenth embodiment of the present invention.

FIG. 16 is a block diagram of a main configuration example of a liquid crystal displaying apparatus according to the tenth embodiment of the present invention and the liquid crystal displaying apparatus includes the FRC portion 10, the controlling portion 13, the switching portion 16, the image synthesis processing portion 22, the synthesizing portion 23, the path 17 disposed separately from the input path to the FRC portion 10, and the memory 19 on the path 17. The descriptions of the electrode driving portion 14 and the liquid crystal displaying panel 15 are omitted. The switching portion 16 is disposed on the subsequent stage of the FRC portion 10 and switches whether the image signal (motion compensation image) from the FRC portion 10 or the image signal of the previous or subsequent frame from the memory 19 is output in accordance with the instruction from the controlling portion 13.

The image synthesis processing portion 22 generates a second image signal related to a still image such as letters and characters (e.g., on-screen display (OSD) signals and data broadcast signals), which is different from the input image signal. The second image signal generated by the image synthesis processing portion 22 is controlled in accordance with instructions and operations performed by a user with the use of a remote controller (remote controlling apparatus), etc.

The synthesizing portion 23 combines (overlaps) the second image signal from the image synthesis processing portion 22 with the input image signal. In this embodiment, the pixel region combined with the second image signal is determined as the low-speed region (i.e., $\alpha=1$) so that the region combined with the second image signal is certainly determined as the still region in the low-speed region.

The controlling portion 13 receives information (such as coordinate position information and region information) of a pixel region combined with second image signal by the image synthesis processing portion 22 and rewrites the α value corresponding to the pixel region combined with the second image signal into α=1 for the α values output from the low-speed region detecting portion 112e disposed in the FRC portion 10. The switching portion 16 is controlled based on this α value and the β value output from the still-region detecting portion 113e disposed in the FRC portion 10.

After the α value is updated and set by the controlling portion 13 based on image synthesis position information, if α=1 and β=0 are determined, that is, if a region is determined as the still region in the low-speed region, the switching portion 16 is switched to the path 17 (the memory 19) side for a pixel corresponding to this region or a region including the pixel to output to the displaying panel the display image signal generated by repeatedly reading from the memory 19 and inserting the image signal of the previous or subsequent frame between the frames of the input image signal. The input image signals are accumulated in the memory 19, and when the still region in the low-speed region is detected, the image signal of a pixel corresponding to this region or a region including the pixel is repeatedly read out.

After the α value is updated and set by the controlling portion 13 based on the image synthesis position information, if α=0 and β=0 are determined, that is, if a region is determined as the still region in the high-speed region, the switching portion 16 is switched to the FRC portion 10 side for a pixel corresponding to this region or a region including the pixel to output to the displaying panel the display image signal subjected to the FRC process (motion compensated frame interpolation process) between the frames of the input image signal.

Since the input image can be separated into the low-speed region and the high-speed region so as to execute the identical-frame insertion process for the still region in the low-speed region and to execute the motion compensation process for the still region in the high-speed region, the collapse in the high-speed region due to the zero-vector preferential interpolation process can be prevented from occurring. For regions other than above, the motion compensated interpolation process is executed.

Since the insertion process of the identical frame image can be executed for the still image portion combined with the second image signal, which is certainly determined as the still region in the low-speed region, the image quality can be prevented from deteriorating due to the motion compensated interpolation process.

Although the switching control of the switching portion 16 is performed based on the α and β values determined by the controlling portion 13 to disable the motion compensation process in the ninth and tenth embodiments, it is needless to say that the interpolation vector may be controlled in accordance with the α and β values as is the case with the first and second embodiments.

Eleventh Embodiment

In an eleventh embodiment of the present invention, an input image is separated into the low-speed region and the high-speed region, and compensation intensity of the motion compensation process can be varied in the interpolation frame generating portion for the still region in the low-speed region. Specifically, an interpolation frame generating portion is included that performs weighted addition of the image signal subjected to the motion compensation process and the image signal subjected to the linear interpolation process at a predetermined rate to generate an interpolation frame, and the weighted addition rate can be varied for a pixel corresponding to the still region in the low-speed region or a region including the pixel.

Figure 17:
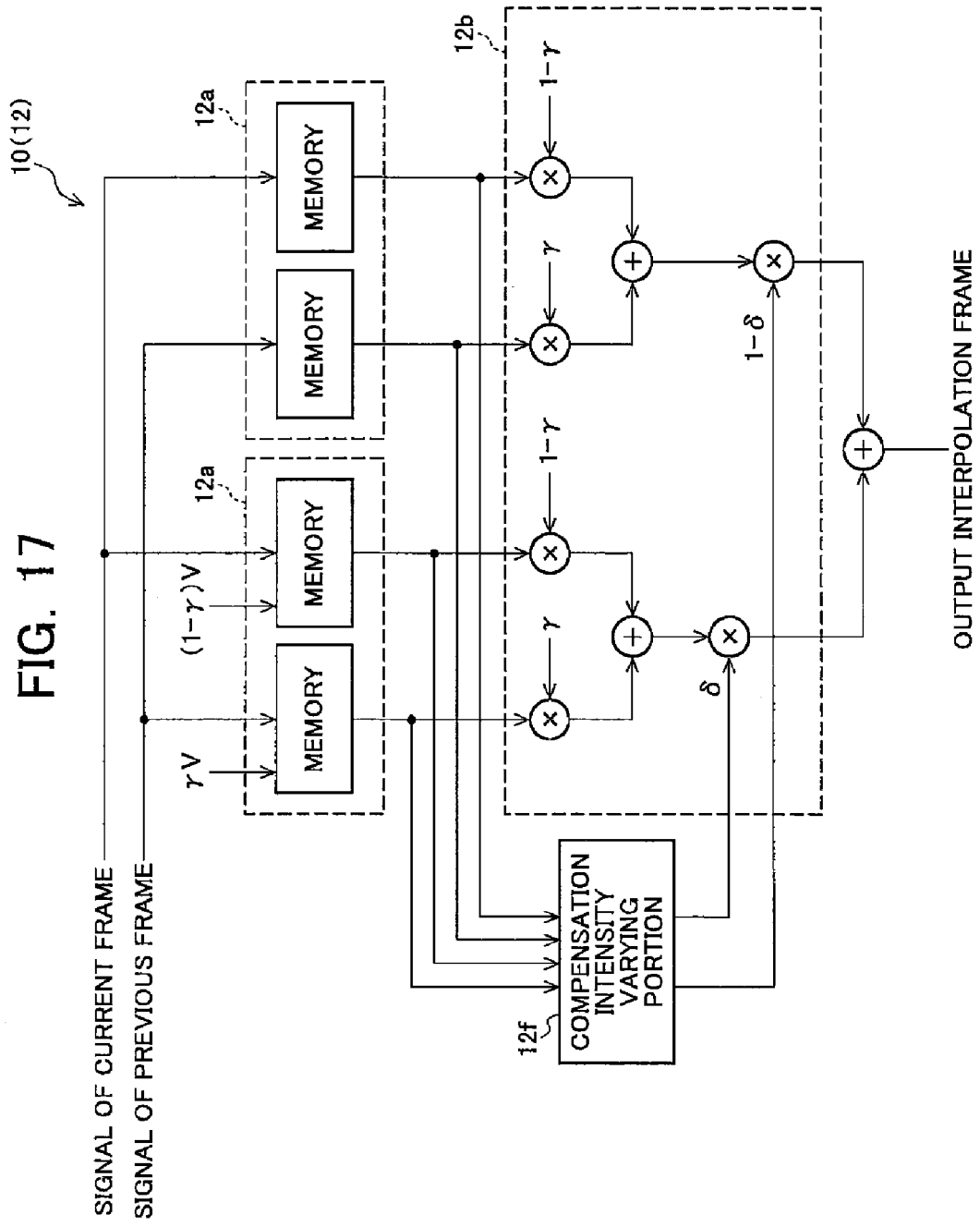
FIG. 17 is a block diagram of a main configuration example of the interpolation frame generating process according to an eleventh embodiment of the present invention.

FIG. 17 is a block diagram of a main configuration example of the FRC portion 10 according to the eleventh embodiment of the present invention and the frame generating portion 12 of the FRC portion 10 includes the interpolation frame memory 12a, the interpolation frame generating portion 12b, and a compensation intensity varying portion 12f that can vary the compensation intensity of the motion compensation process in the FRC portion 10. In FIG. 17, V is an interpolation vector; γ is a frame interpolation rate; and δ is compensation intensity (weighted addition rate).

Generally, known methods of the frame interpolation process include the frame interpolation in accordance with the linear interpolation between two frames and the frame interpolation using motion vectors (motion compensated interpolation). In the former case, an interpolation frame is acquired by performing linear interpolation from the signal of the previous frame and the signal of the current frame with a frame interpolation rate γ.

On the other hand, to acquire an interpolation frame from the previous frame and the current frame in the latter case, an interpolation vector V is detected from the motion vectors between the previous frame image and the current frame image, and the interpolation frame is acquired from the weighted addition of a signal of the previous frame image shifted by a degree of γV obtained by dividing the value (interpolation vector V) by the frame interpolation rate γ and a signal of the current frame shifted by (γ−1)V. Although good image quality can be acquired without deteriorating the resolution since a moving picture itself is captured and compensated by using this motion compensated interpolation, the above collapse in the interpolation image may occur due to this process.

Therefore, in this embodiment, the compensation intensity varying portion 12f is disposed in the frame generating portion 12. If α=1 is input from the low-speed region detecting portion 112e and β=0 is input from the still-region detecting portion 113e, that is, if the still region in the low-speed region is detected, the compensation intensity varying portion 12f varies the weighted addition rate δ for a pixel corresponding to this region or a region including the pixel. The weighted addition rate δ is a rate for performing the weighted addition of the image signal subjected to the motion compensation process and the image signal subjected to the linear interpolation process. The interpolation frame generating portion 12b of the present embodiment performs the weighted addition of the linear interpolation and the motion compensated interpolation in accordance with the weighted addition rate δ to generate the interpolation frame for a pixel corresponding to the still region in the low-speed region or a region including the pixel.

For example, the compensation intensity varying portion 12f sets the weighted addition rate δ=0 for a pixel corresponding to the still region in the low-speed region or a region including the pixel to define the image signal subjected to the linear interpolation process as the interpolation frame. If α=0 is input from the low-speed region detecting portion 112e and β=0 is input from the still-region detecting portion 113e, that is, if the still region in the high-speed region is detected, the weighted addition rate δ=1 is set for a pixel corresponding to this region or a region including the pixel to define the image signal subjected to the motion compensation process as the interpolation frame.

Since the weighted addition rate δ can arbitrarily and variably be set, the weighted addition rate δ can be set to substantially the middle value between zero and one. This can appropriately improve both the image quality deterioration due to the motion blur and the image quality deterioration in the high-speed region. The process of varying the compensation intensity in the FRC portion 10 may be implemented by either a method performed for each pixel or a method performed for each block (region).

Since the input image can be separated into the low-speed region and the high-speed region so as to vary and weaken the compensation intensity of the motion compensation process for the still region in the low-speed region and to execute the motion compensation process for the still region in the high-speed region, the collapse in the high-speed region due to the zero-vector preferential interpolation process can be constrained to occur. For regions other than above, the motion compensated interpolation process is executed.

If an interpolation process other than the motion compensation process is executed for a portion of the subject of shooting and an interpolation process using motion vectors is executed for the background portion of the subject, the collapse may occur at the ends of the subject as shown in FIG. 27(B). Therefore, as shown in FIG. 18, the collapse occurring at the ends of the low-speed region can be alleviated by expanding at least one end of the still region of the low-speed region in the motion direction of the image or the opposite direction thereof by a predetermined amount.

Figure 18:
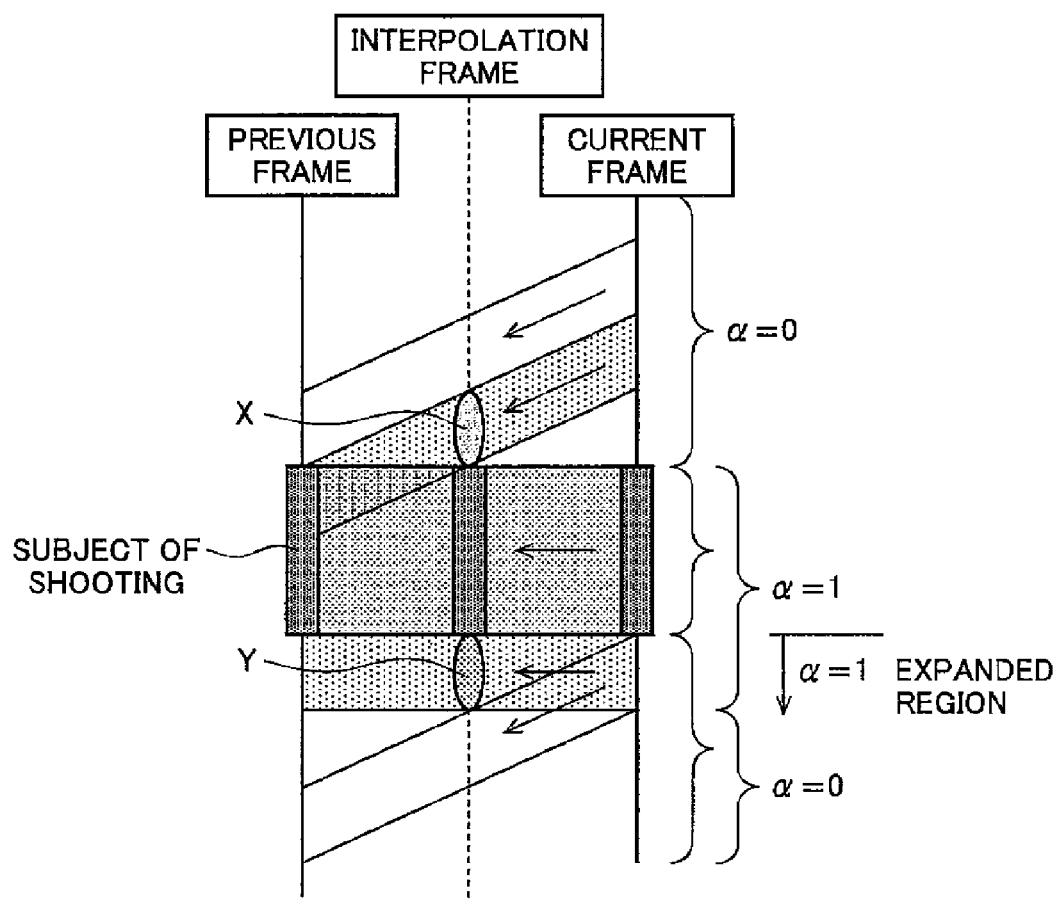
FIG. 18 is a diagram for explaining an example of a method of improving a collapse occurring at the ends of the low-speed region.

FIG. 18 is a diagram for explaining an example of a method of improving the collapse occurring at the ends of the low-speed region. This example shows a state when the low-speed region (α region) is expanded in a direction opposite to the motion vector of the high-speed region corresponding to the background in the case of one-direction interpolation (generating the interpolation image only from the current frame image) process. In the case of one-direction interpolation, although no collapse occurs in a region X in the direction of motion vectors of an image in the high-speed region corresponding to the background, the collapse occurs in a region Y in the opposite direction. Therefore, the collapse can be alleviated by enabling the zero-vector preferential interpolation process (α=1) for this portion (region Y).

For example, assuming that the motion vector of the image in the high-speed region corresponding to the background is V, the expansion size of the region Y (α region) is −V/2. In the case of both-direction interpolation (generating the interpolation image from the previous frame and current frame images and typically using an average of images of two frames as the interpolation image), since the collapse occurs in the both ends (region X and region Y) of the low-speed region, the α region may be expanded on the both sides of the low-speed region.

Twelfth Embodiment

Figure 19:
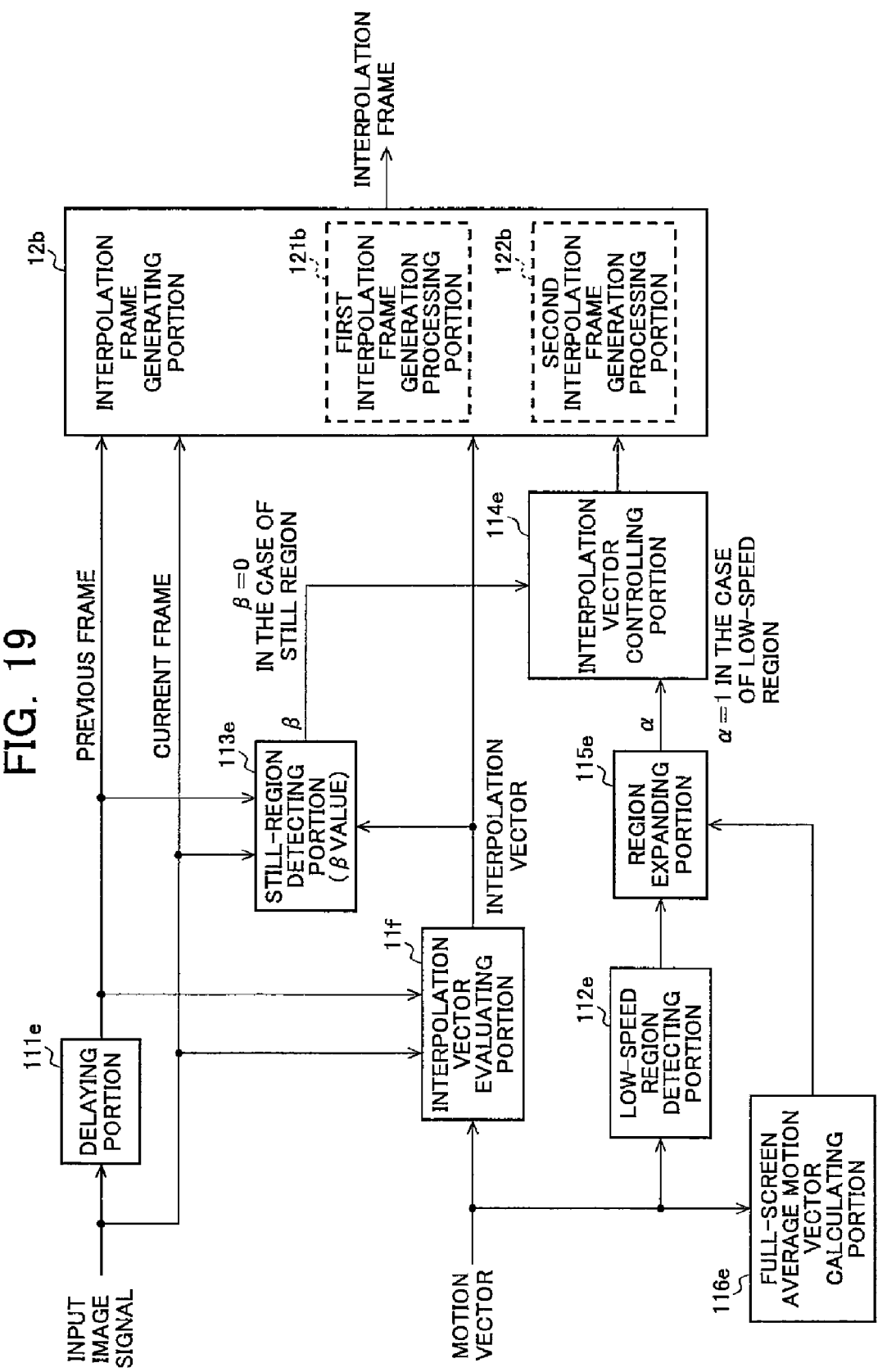
FIG. 19 is a block diagram of a main configuration example of the interpolation frame generating process according to a twelfth embodiment of the present invention.

FIG. 19 is a block diagram of a main configuration example of the interpolation frame generating process according to a twelfth embodiment of the present invention The configuration of the embodiment includes the delaying portion 111e, the low-speed region detecting portion 112e, the still-region detecting portion 113e, the interpolation vector controlling portion 114e, the first interpolation frame generation processing portion 121b, the second interpolation frame generation processing portion 122b, and the interpolation vector evaluating portion 11f and further includes a region expanding portion 115e and a full-screen average motion vector calculating portion 116e.

The full-screen average motion vector calculating portion 116e calculates a full-screen average motion vector V of the entire screen of the displaying panel from the motion vectors detected by the motion vector detecting portion 11e and outputs the full-screen average motion vector V to the region expanding portion 115e. The region expanding portion 115e expands at least one end of the low-speed region detected by the low-speed region detecting portion 112e with a predetermined amount based on the full-screen average motion vector V calculated by the full-screen average motion vector calculating portion 116e. For example, the α region is expanded by −V/2 for the full-screen average motion vector V.

Thirteenth Embodiment

Figure 20:
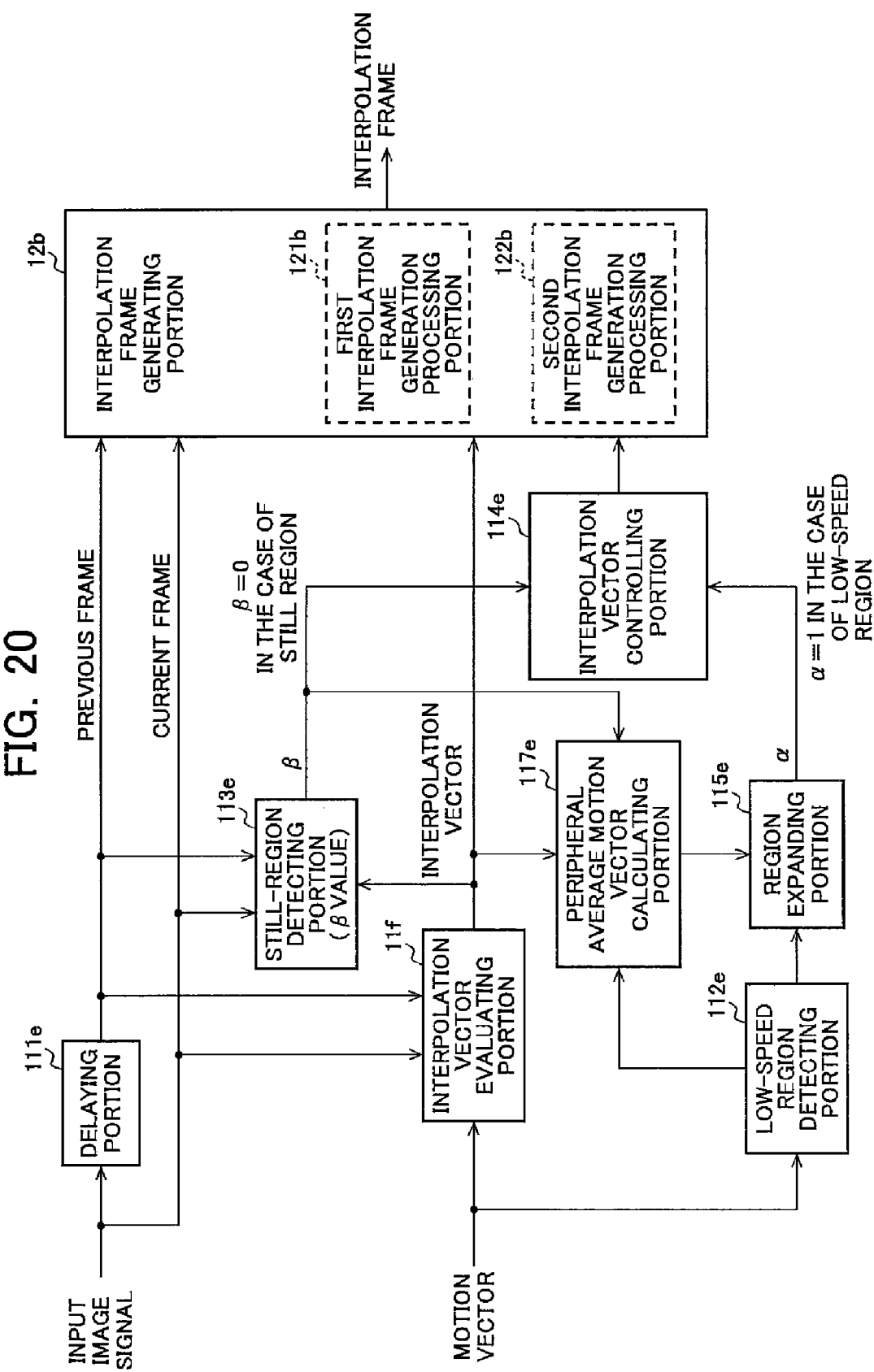
FIG. 20 is a block diagram of a main configuration example of the interpolation frame generating process according to a thirteenth embodiment of the present invention.

FIG. 20 is a block diagram of a main configuration example of the interpolation frame generating process according to a thirteenth embodiment of the present invention. The configuration of the embodiment includes the delaying portion 111e, the low-speed region detecting portion 112e, the still-region detecting portion 113e, the interpolation vector controlling portion 114e, the first interpolation frame generation processing portion 121b, the second interpolation frame generation processing portion 122b, and the interpolation vector evaluating portion 11f and further includes the region expanding portion 115e and a peripheral average motion vector calculating portion 117e.

The peripheral average motion vector calculating portion 117e uses the detection results from the low-speed region detecting portion 112e and the still-region detecting portion 113e to calculate a peripheral average motion vector V in the peripheral region of the still region in the low-speed region from the interpolation vector allocated by the interpolation vector evaluating portion 11f and outputs the peripheral average motion vector V to the region expanding portion 115e.

The region expanding portion 115e expands at least one end of the low-speed region detected by the low-speed region detecting portion 112e with a predetermined amount based on the peripheral average motion vector V calculated by the peripheral average motion vector calculating portion 117e. For example, the α region is expanded by −V/2 for the peripheral average motion vector V. The peripheral average motion vector V may be either an average or a weighted average of the motion vectors of the peripheral region of the still region in the low-speed region.

Although the motion vectors from the motion vector detecting portion 11e are used when detecting a motion amount of the low-speed region included in the input image or the entire screen in the twelfth and thirteenth embodiment, it is needless to say that the interpolation vector output from the interpolation vector evaluating portion 11f may be utilized.

Fourteenth Embodiment

Figure 21:
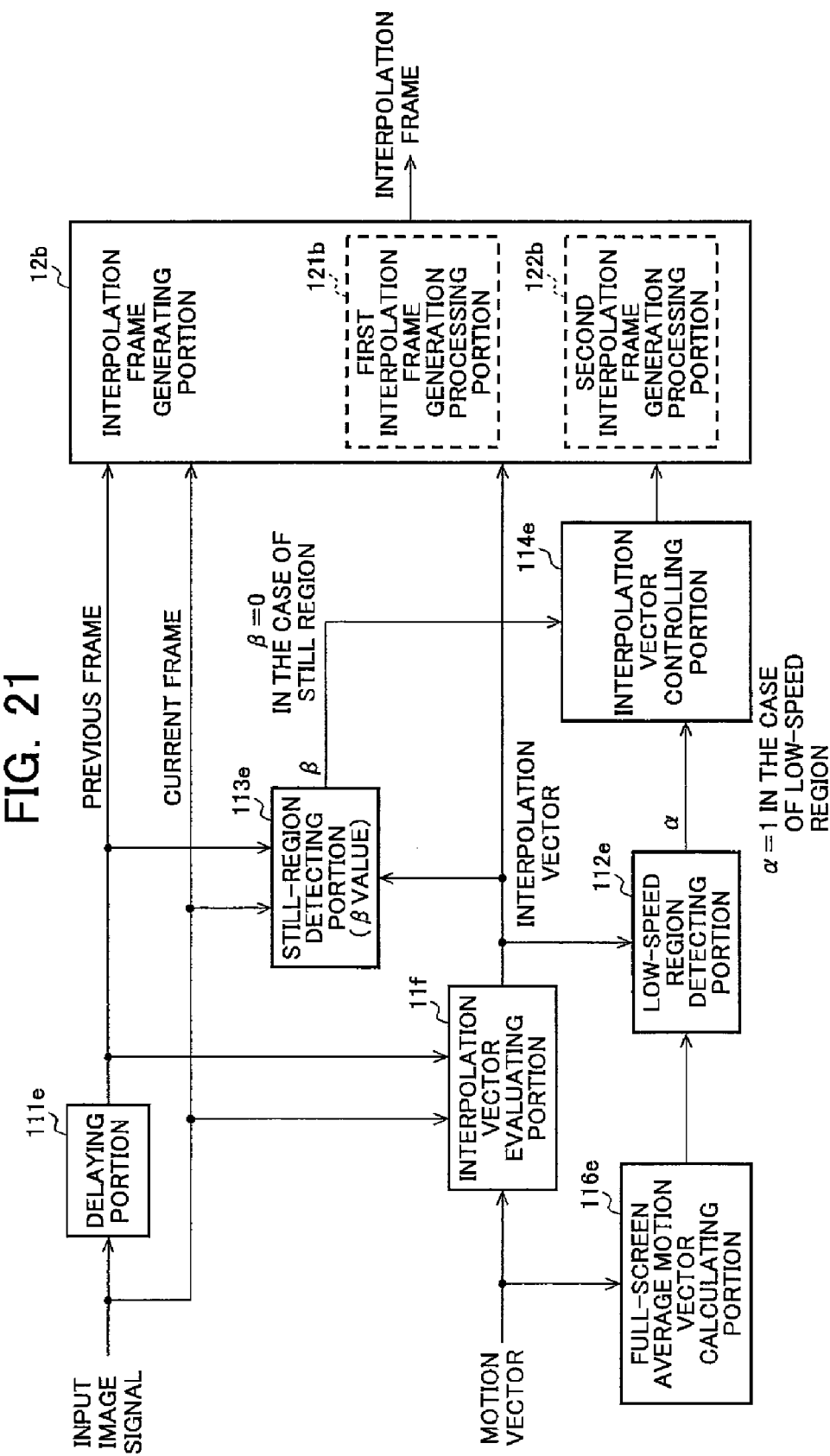
FIG. 21 is a block diagram of a main configuration example of the interpolation frame generating process according to a fourteenth embodiment of the present invention.

FIG. 21 is a block diagram of a main configuration example of the interpolation frame generating process according to a fourteenth embodiment of the present invention. The configuration of the embodiment includes the delaying portion 111e, the low-speed region detecting portion 112e, the still-region detecting portion 113e, the interpolation vector controlling portion 114e, the interpolation frame generating portion 12b, and the interpolation vector evaluating portion 11f and further includes the full-screen average motion vector calculating portion 116e.

The full-screen average motion vector calculating portion 116e calculates a full-screen average motion vector of the entire screen of the displaying panel from the motion vectors detected by the motion vector detecting portion 11e and outputs the full-screen average motion vector V to the low-speed region detecting portion 112e.

The low-speed region detecting portion 112e detects an interpolation block as the low-speed region when the interpolation vector output from the interpolation vector evaluating portion 11f is equal to or less than a predetermined value. In this embodiment, a threshold for detecting the low-speed region in the low-speed region detecting portion 112e can be varied in accordance with the full-screen average motion vector value output from the full-screen average motion vector calculating portion 116e.

For example, if the screen average vector length output from the full-screen average motion vector calculating portion 116e is "16", the threshold for detecting the low-speed region in the low-speed region detecting portion 112e is set to "12". If the screen average vector length output from the full-screen average motion vector calculating portion 116e is "8", the threshold for detecting the low-speed region in the low-speed region detecting portion 112e is set to "6".

By variably controlling the predetermined threshold for detecting the low-speed region in accordance with the screen average motion vector, the high-speed region and the low-speed region in the screen can be separated in accordance with a relative speed difference. If the screen average vector length output from the full-screen average motion vector calculating portion 116e is small, the threshold for detecting the low-speed region in the low-speed region detecting portion 112e may be zero. That is, if a motion amount of the entire screen is small, the high-speed region and the low-speed region may not be separated.

Although, in the fourteenth embodiment, the motion vectors output from the motion vector detecting portion 11e are used when detecting the motion amount in the entire screen of the input image, it is needless to say that the interpolation vectors output from the interpolation vector evaluating portion 11f may be used.

Although the interpolation vector output from the interpolation vector evaluating portion 11f are used when detecting the low-speed region in the low-speed region detecting portion 112e, it is needless to say that the motion vectors output from the motion vector detecting portion 11e may be used.

If the first region (high-speed region) is disposed in addition to the second region (low-speed region) detecting portion in the above embodiment, not only the threshold for detecting the low-speed region but also the threshold for detecting the high-speed region may be varied in accordance with the motion amount of the entire screen.

Although the motion amount of the entire screen is detected with the use of the average value in one frame of the motion vectors output from the motion vector detecting portion 11e in the above embodiment, this is not a limitation, and the motion amount can be detected by using a method of detecting the panning of the camera or a method of detecting the motion amount of the entire screen from the related data such as camera parameters added to the input image signal.

Figure 22:
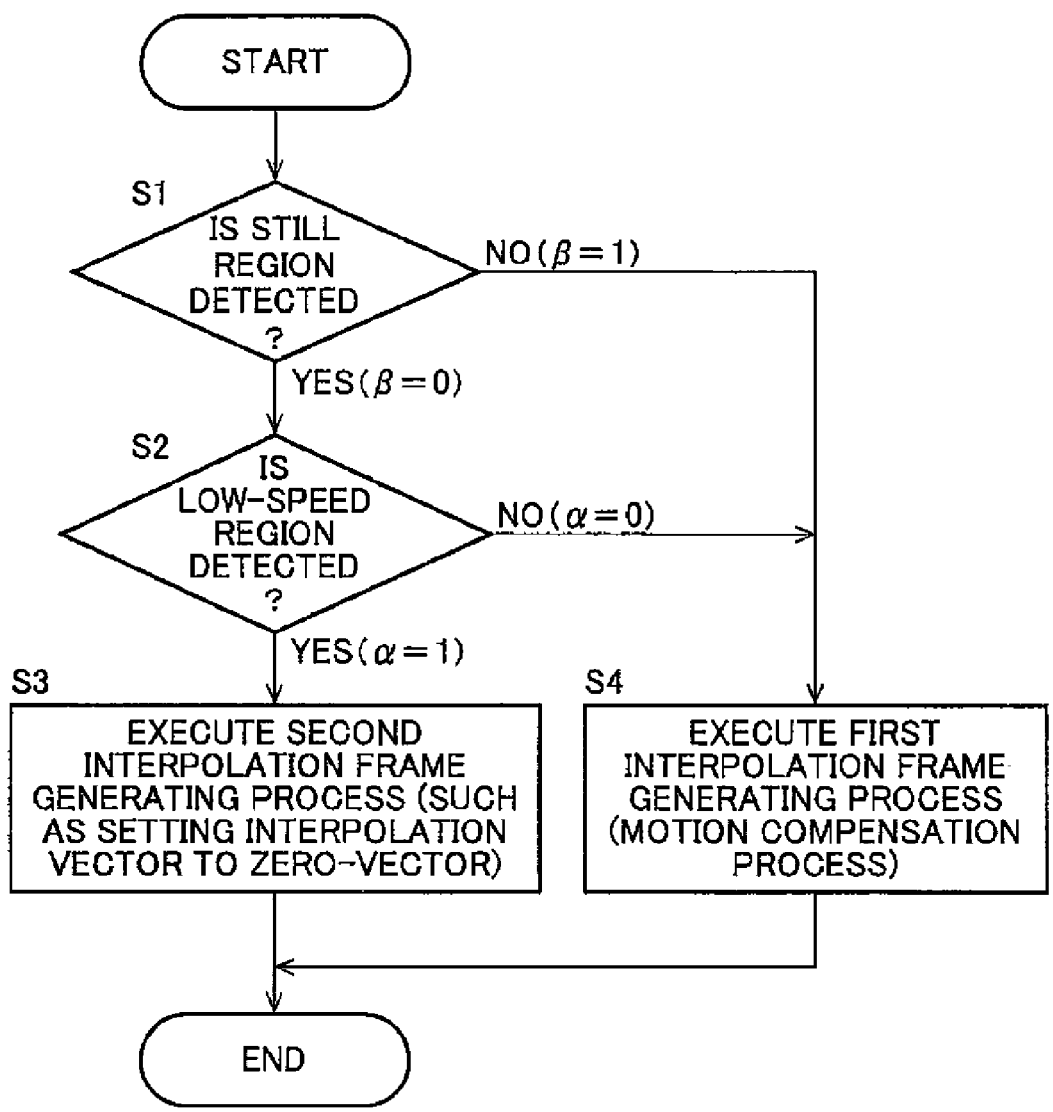
FIG. 22 is a flow diagram for explaining an example of an image displaying method of the image displaying apparatus of the present invention.

FIG. 22 is a flow diagram for explaining an example of an image displaying method of the image displaying apparatus of the present invention. The image displaying apparatus determines whether a still region is detected based on the inter-frame difference between the previous frame and the current frame (step S1), and if the still region is not detected (in the case of $\beta=1$, NO), the image displaying apparatus goes to step S4 to execute a first interpolation frame generating process (motion compensated interpolation process).

If the still region is detected at step S1 (in the case of $\beta=0$, YES), the image displaying apparatus determines whether or not the low-speed region including a motion vector equal to or less than a predetermined amount is detected (step S2), and if the low-speed region is detected (in the case of $\alpha=1$, YES), a second interpolation frame generating process (setting the interpolation vector to zero-vector) is executed for the still region in the low-speed region (step S4).

If the low-speed region is not detected at step S2 (in the case of $\alpha=0$, NO), the image displaying apparatus goes to step S4 to execute the first interpolation frame generating process.

Figure 23:
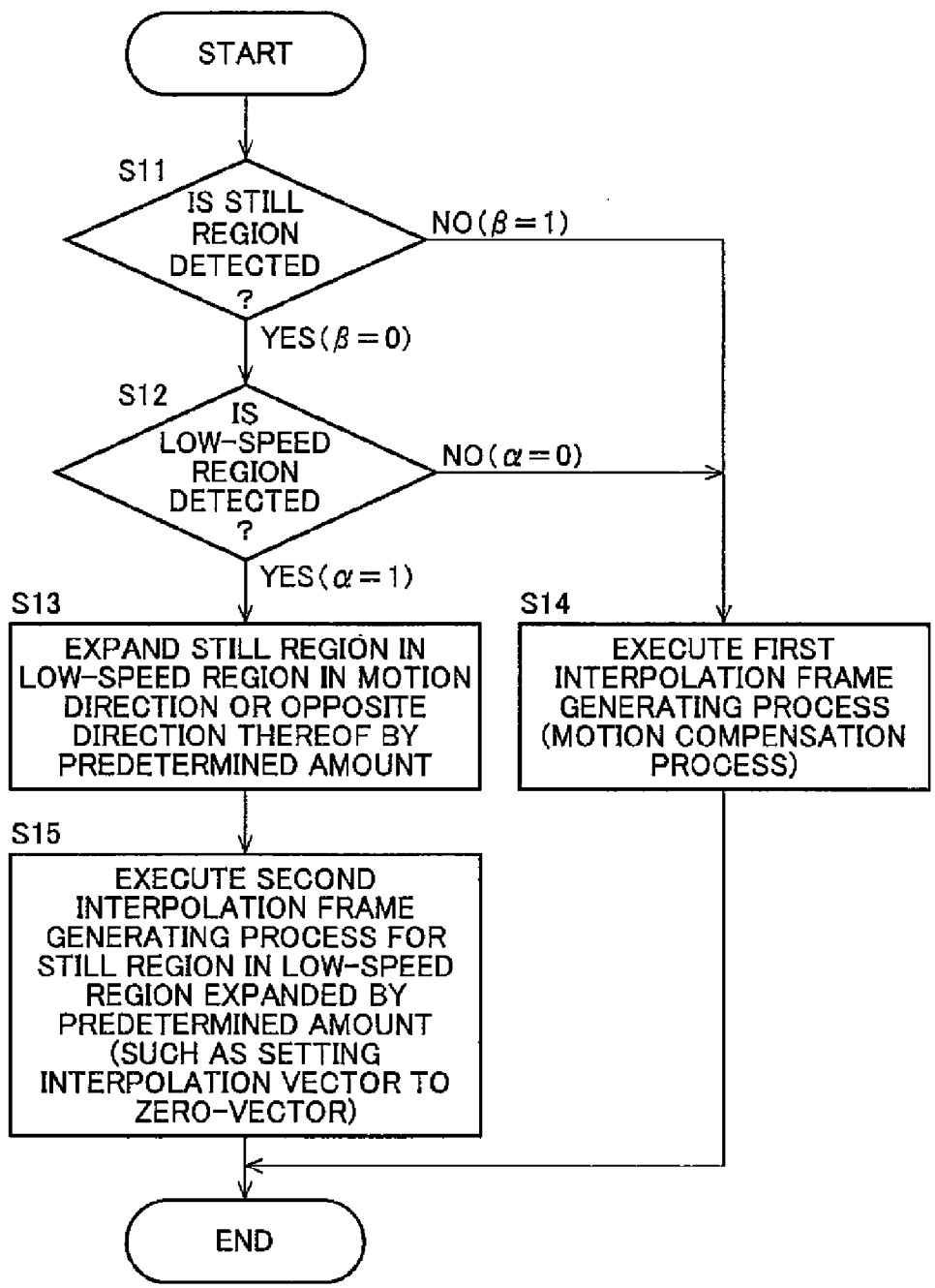
FIG. 23 is a flow diagram for explaining another example of an image displaying method of the image displaying apparatus of the present invention.
Figure 24:
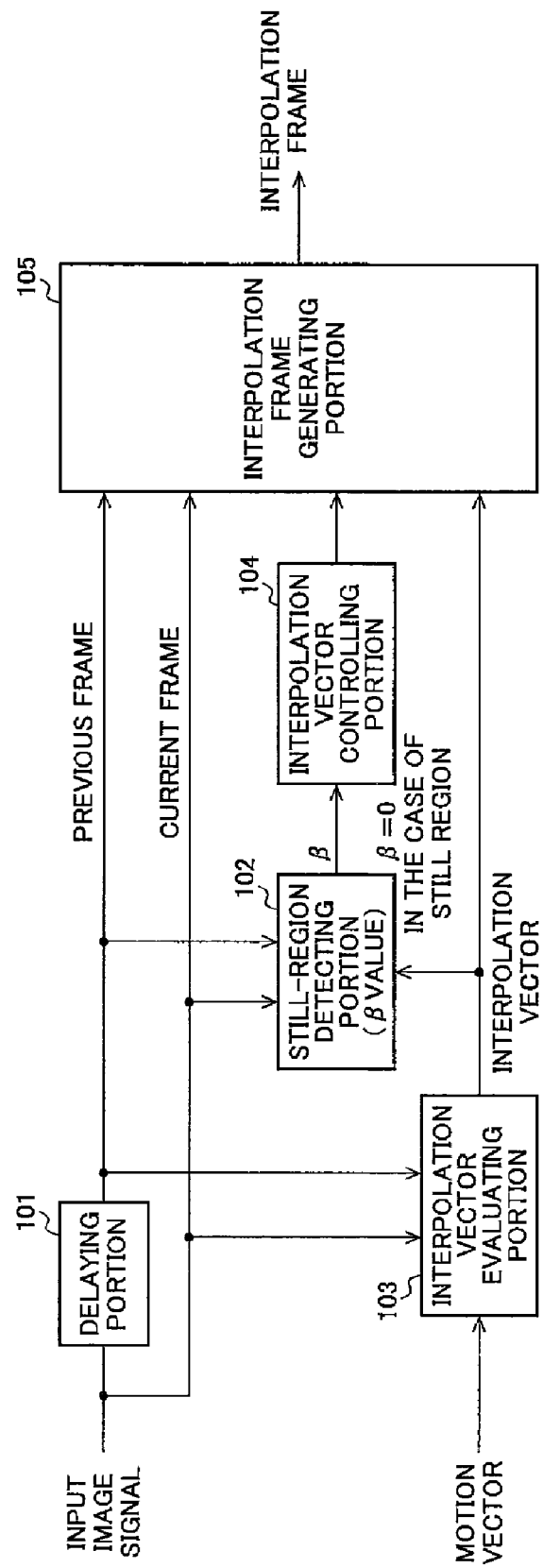
FIG. 24 is a block diagram of a main configuration of an interpolation frame generating process of a conventional frame rate converting portion.
Figure 28:
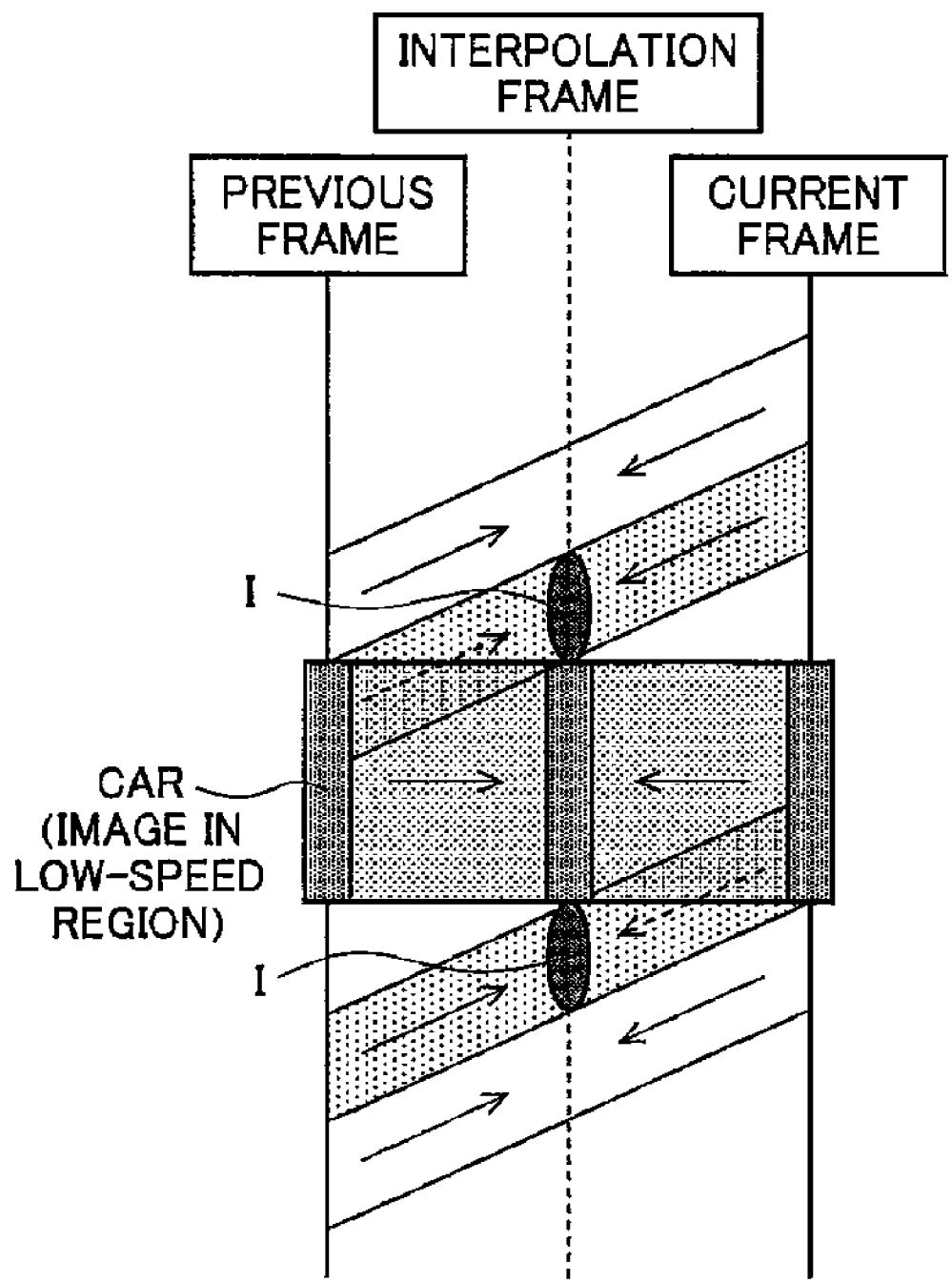
FIG. 28 is a diagram for explaining a principle of the collapse generated at the ends of the low-speed region.

FIG. 23 is a flow diagram for explaining another example of an image displaying method of the image displaying apparatus of the present invention. The image displaying apparatus determines whether a still region is detected based on the inter-frame difference between the previous frame and the current frame (step S11), and if the still region is not detected (in the case of $\beta=1$, NO), the image displaying apparatus goes to step S14 to execute the first interpolation frame generating process (motion compensated interpolation process).

If the still region is detected at step S11 (in the case of $\beta=0$, YES), it is determined whether or not the low-speed region including a motion vector equal to or less than a predetermined amount is detected (step S12), and if the low-speed region is detected (in the case of $\alpha=1$, YES), a process is executed to expand the still region in the low-speed region by a predetermined amount in the motion direction or the opposite direction thereof (step S13).

The image displaying apparatus executes the second interpolation frame generating process (setting the interpolation vector to zero-vector) for the still region in the low-speed region expanded by a predetermined amount at step S13 (step S15).

If the low-speed region is not detected at step S12 (in the case of $\alpha=0$, NO), the image displaying apparatus goes to step S14 to execute the first interpolation frame generating process.

As described above, according to the present invention, since different interpolation processes can be executed for a plurality of regions having different motion amounts, such as the low-speed region and the high-speed region of the input image in an image processing apparatus or image displaying apparatus including a motion compensated rate converting (FRC) portion, the collapse in the high-speed region due to the zero-vector preferential interpolation process can be prevented from occurring.

If an interpolation process other than the motion compensation process is executed for the still region in the low-speed region and a motion compensated interpolation process is executed with the use of motion vectors for a peripheral region thereof, the low-speed region is expanded by a predetermined amount to alleviate the collapse occurring at the ends of the low-speed region due to the motion vectors around the still region in the low-speed region.

Although examples of the embodiments of the image processing apparatus and method of the present invention have been described in the above description, the description also facilitates understanding of an image processing program causing a computer to execute the image processing method as a program and a program recording medium that is a computer-readable recording medium having the image processing program recorded thereon.

Although the image processing apparatus of the present invention has been described in the form integrally disposed in the image displaying apparatus in the above embodiments, this is not a limitation and it is needless to say that the image processing apparatus of the present invention may be disposed in video output devices such as various recording medium reproducing apparatuses, for example.

The invention claimed is:

1. An image displaying apparatus having a rate converting portion that interpolates an image signal subjected to a motion compensation process between frames or fields of an input image signal to convert and output the number of frames or fields of the input image signal to a displaying panel, comprising:
   a first region detecting portion that detects a first region including a pixel having a motion amount equal to or greater than a first predetermined amount between the frames or fields of the input image signal;
   a second region detecting portion that detects a second region different from the first region, the second region including a pixel having a motion amount equal to or less than a second predetermined amount between the frames or fields of the input image signal; and
   a third region detecting portion that detects a still region from an inter-frame or inter-field difference of the input image signal, wherein the rate converting portion executes a first interpolation frame generating process using motion vectors for the still region in the first region and executes a second interpolation frame generating process different from the first interpolation frame generating process for the still region in the second region.

2. The image displaying apparatus as defined in claim 1, wherein the second interpolation frame generating process is a process of disabling the motion compensation process in the rate converting portion.

3. The image displaying apparatus as defined in claim 1 or 2, wherein
   the rate converting portion includes a motion vector detecting portion that detects motion vector information between consecutive frames or fields included in the input image signal,
   an interpolation vector allocating portion that allocates an interpolation vector between the frames or the fields based on the detected motion vector information,
   an interpolation image generating portion that generates an interpolation image signal from the allocated interpolation vector, and
   an image interpolating portion that interpolates the generated interpolation image signal between the frames or the fields.

4. The image displaying apparatus as defined in claim 3, wherein
   the second interpolation frame generating process is a process of setting an interpolation vector of an interpolation block corresponding to the still region in the second region to zero-vector to disable the motion compensation process for each pixel of the interpolation block.

5. The image displaying apparatus as defined in claim 4, wherein
   the interpolation block has flag information added and wherein the interpolation vector of the interpolation block having the flag information added is set to zero-vector.

6. The image displaying apparatus as defined in claim 1, wherein
   the second interpolation frame generating process is a process of generating an image signal not subjected to the motion compensation process between the frames or fields of the input image signal.

7. The image displaying apparatus as defined in claim 6, wherein
   the second interpolation frame generating process is a process of generating an image signal acquired by subjecting the image signal of the frames or fields to a linear interpolation process between the frames or fields of the input image signal.

8. The image displaying apparatus as defined in claim 6, wherein
   the second interpolation frame generating process is a process of generating an image signal identical to the image signal of the frames or fields between the frames or fields of the input image signal.

9. The image displaying apparatus as defined in claim 1, wherein
   the second interpolation frame generating process is a process of varying compensation intensity of the motion compensation process in the rate converting portion.

10. The image displaying apparatus as defined in claim 9, wherein
    the second interpolation frame generating process is a process of performing weighted addition of an image signal subjected to the motion compensation process and an image signal subjected to the linear interpolation process at a predetermined rate to generate an interpolation image signal.

11. The image displaying apparatus as defined in claim 10, wherein
    the image signal subjected to the linear interpolation process is used as the interpolation image signal for the still region in the second region and wherein the image signal subjected to the motion compensation process is used as the interpolation image signal for the still region in the first region.

12. The image displaying apparatus as defined in claim 1, wherein
    the motion compensation process in the rate converting portion is sequentially varied in intensity in a boundary between the region subjected to the second interpolation frame generating process and other regions.

13. The image displaying apparatus as defined in claim 1, comprising:
    a telop region detecting portion that detects a telop region included in the input image signal,
    the telop region being detected as the first region.

14. The image displaying apparatus as defined in claim 1, comprising:
    an image synthesis processing portion that combines a second image signal different from the input image signal with the input image signal,
    the region combined with the second image signal being detected as the second region.

15. The image displaying apparatus as defined in claim 14, wherein
    the second image signal is an on-screen display signal generated within the image displaying apparatus.

16. The image displaying apparatus as defined in claim 14, wherein
    the second image signal is a data information display signal acquired by receiving data broadcast.

17. The image displaying apparatus as defined in claim 1, comprising:
    a portion that expands at least one end of the still region in the second region in a motion direction or an opposite direction thereof by a predetermined amount.

18. The image displaying apparatus as defined in claim 17, comprising:
    a full-screen motion amount calculating portion that calculates a motion amount of the entire screen of the displaying panel, wherein the amount of expanding the still region in the second region is determined based on the motion amount of the entire screen.

19. The image displaying apparatus as defined in claim 17, comprising:
a full-screen motion amount calculating portion that calculates a motion amount of a peripheral region of the still region in the second region, wherein
the amount of expanding the still region in the second region is determined based on the motion amount of the peripheral region.

20. The image displaying apparatus as defined in claim 1, comprising:
a full-screen motion amount calculating portion that calculates a motion amount of the entire screen of the displaying panel, wherein
the first predetermined amount and/or the second predetermined amount are varied in accordance with the motion amount of the entire screen.

21. The image displaying apparatus as defined in any one of claims 18 to 20, wherein
the full-screen motion amount calculating portion uses an average value of motion vectors in the entire screen of the displaying panel to calculate the motion amount of the entire screen.

22. The image displaying apparatus as defined in any one of claims 18 to 20, wherein
the full-screen motion amount calculating portion uses predetermined related data added to the input image signal to calculate the motion amount of the entire screen.

23. The image displaying apparatus as defined in claim 1, wherein
the first predetermined amount and the second predetermined amount are the same.

24. An image displaying apparatus having a rate converting portion that interpolates an image signal subjected to a motion compensation process between frames or fields of an input image signal to convert and output the number of frames or fields of the input image signal to a displaying panel, comprising:
a low-speed region detecting portion that detects a low-speed region including a pixel having a motion amount equal to or less than a predetermined amount between the frames or fields of the input image signal; and
a still region detecting portion that detects a still region from an inter-frame or inter-field difference of the input image signal, wherein
the rate converting portion executes a first interpolation frame generating process using motion vectors for regions other than the still region in the low-speed region and executes a second interpolation frame generating process different from the first interpolation frame generating process for the still region in the low-speed region.

25. The image displaying apparatus as defined in claim 24, wherein
the second interpolation frame generating process is a process of disabling the motion compensation process in the rate converting portion.

26. The image displaying apparatus as defined in claim 24, wherein
the second interpolation frame generating process is a process of varying compensation intensity of the motion compensation process in the rate converting portion.

27. An image displaying method, performed by a processing device, having a step of interpolating an image signal subjected to a motion compensation process between frames or fields of an input image signal to convert the number of frames or fields of the input image signal, the method comprising the steps of:
detecting a first region including a pixel having a motion amount equal to or greater than a first predetermined amount between the frames or fields of the input image signal;
detecting a second region different from the first region, the second region including a pixel having a motion amount equal to or less than a second predetermined amount between the frames or fields of the input image signal;
detecting a still region from an inter-frame or inter-field difference of the input image signal; and
executing, by the processing device, a first interpolation frame generating process using motion vectors for the still region in the first region and executing a second interpolation frame generating process different from the first interpolation frame generating process for the still region in the second region.

28. An image displaying method, performed by a processing device, having a step of interpolating an image signal subjected to a motion compensation process between frames or fields of an input image signal to convert the number of frames or fields of the input image signal, the method comprising the steps of:
detecting a first region including a pixel having a motion amount equal to or greater than a first predetermined amount between the frames or fields of the input image signal;
detecting a second region different from the first region, the second region including a pixel having a motion amount equal to or less than a second predetermined amount between the frames or fields of the input image signal;
detecting a still region from an inter-frame or inter-field difference of the input image signal;
expanding at least one end of the still region in the second region in a motion direction or an opposite direction thereof by a predetermined amount; and
executing, by the processing device, a first interpolation frame generating process using motion vectors for the still region in the first region and executing a second interpolation frame generating process different from the first interpolation frame generating process for the still region in the second region expanded by the predetermined amount.

29. An image displaying method, performed by a processing device, having a step of interpolating an image signal subjected to a motion compensation process between frames or fields of an input image signal to convert the number of frames or fields of the input image signal, the method comprising the steps of:
detecting a low-speed region including a pixel having a motion amount equal to or less than a predetermined amount between the frames or fields of the input image signal;
detecting a still region from an inter-frame or inter-field difference of the input image signal;
executing, by the processing device, a first interpolation frame generating process using motion vectors for regions other than the still region in the low-speed region and executing a second interpolation frame generating process different from the first interpolation frame generating process for the still region in the low-speed region.

30. An image processing apparatus having a rate converting portion that interpolates an image signal subjected to a motion compensation process between frames or fields of an input image signal to convert the number of frames or fields of the input image signal, comprising:

a first region detecting portion that detects a first region including a pixel having a motion amount equal to or greater than a first predetermined amount between the frames or fields of the input image signal;

a second region detecting portion that detects a second region different from the first region, the second region including a pixel having a motion amount equal to or less than a second predetermined amount between the frames or fields of the input image signal; and a third region detecting portion that detects a still region from an inter-frame or inter-field difference of the input image signal, wherein the rate converting portion executes a first interpolation frame generating process using motion vectors for the still region in the first region and executes a second interpolation frame generating process different from the first interpolation frame generating process for the still region in the second region.

31. The image processing apparatus as defined in claim 30, comprising:

a portion that expands at least one end of the still region in the second region in a motion direction or an opposite direction thereof by a predetermined amount.

32. An image processing apparatus having a rate converting portion that interpolates an image signal subjected to a motion compensation process between frames or fields of an input image signal to convert the number of frames or fields of the input image signal, comprising:

a low-speed region detecting portion that detects a low-speed region including a pixel having a motion amount equal to or less than a predetermined amount between the frames or fields of the input image signal; and a still region detecting portion that detects a still region from an inter-frame or inter-field difference of the input image signal, wherein the rate converting portion executes a first interpolation frame generating process using motion vectors for regions other than the still region in the low-speed region and executes a second interpolation frame generating process different from the first interpolation frame generating process for the still region in the low-speed region.

33. An image processing method, performed by a processing device, having a step of interpolating an image signal subjected to a motion compensation process between frames or fields of an input image signal to convert the number of frames or fields of the input image signal, the method comprising the steps of:

detecting a first region including a pixel having a motion amount equal to or greater than a first predetermined amount between the frames or fields of the input image signal;

detecting a second region different from the first region, the second region including a pixel having a motion amount equal to or less than a second predetermined amount between the frames or fields of the input image signal;

detecting a still region from an inter-frame or inter-field difference of the input image signal; and executing, by the processing device, a first interpolation frame generating process using motion vectors for the still region in the first region and executing a second interpolation frame generating process different from the first interpolation frame generating process for the still region in the second region.

34. An image processing method, performed by a processing device, having a step of interpolating an image signal subjected to a motion compensation process between frames or fields of an input image signal to convert the number of frames or fields of the input image signal, the method comprising the steps of:

detecting a first region including a pixel having a motion amount equal to or greater than a first predetermined amount between the frames or fields of the input image signal;

detecting a second region different from the first region, the second region including a pixel having a motion amount equal to or less than a second predetermined amount between the frames or fields of the input image signal;

detecting a still region from an inter-frame or inter-field difference of the input image signal;

expanding at least one end of the still region in the second region in a motion direction or an opposite direction thereof by a predetermined amount; and executing, by the processing device, a first interpolation frame generating process using motion vectors for the still region in the first region and executing a second interpolation frame generating process different from the first interpolation frame generating process for the still region in the second region expanded by the predetermined amount.

35. An image processing method, performed by a processing device, having a step of interpolating an image signal subjected to a motion compensation process between frames or fields of an input image signal to convert the number of frames or fields of the input image signal, the method comprising the steps of:

detecting a low-speed region including a pixel having a motion amount equal to or less than a predetermined amount between the frames or fields of the input image signal;

detecting a still region from an inter-frame or inter-field difference of the input image signal; and executing, by the processing device, a first interpolation frame generating process using motion vectors for regions other than the still region in the low-speed region and executing a second interpolation frame generating process different from the first interpolation frame generating process for the still region in the low-speed region.

* * * * *